United States Patent
Meng et al.

(10) Patent No.: US 12,476,674 B2
(45) Date of Patent: Nov. 18, 2025

(54) CHANNEL MEASUREMENT METHOD AND PRECODING METHOD AND APPARATUS

(71) Applicant: HUAWEI TECHNOLOGIES CO., LTD., Shenzhen (CN)

(72) Inventors: Xin Meng, Shanghai (CN); Ye Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/303,067

(22) Filed: Apr. 19, 2023

(65) Prior Publication Data

US 2023/0261704 A1   Aug. 17, 2023

Related U.S. Application Data

(63) Continuation of application No. PCT/CN2021/116159, filed on Sep. 2, 2021.

(30) Foreign Application Priority Data

Oct. 22, 2020  (CN) .......................... 202011141660.3

(51) Int. Cl.
  *H04L 5/00* (2006.01)
  *H04B 7/0456* (2017.01)

(52) U.S. Cl.
  CPC ......... *H04B 7/0456* (2013.01); *H04L 5/0048* (2013.01)

(58) Field of Classification Search
  CPC ............. H04L 25/0204; H04L 25/0226; H04L 25/03955; H04L 5/001; H04L 5/0023;
  (Continued)

(56) References Cited

U.S. PATENT DOCUMENTS

| | | | |
|---|---|---|---|
| 2014/0341312 A1* | 11/2014 | Lee ....................... | H04L 1/0028 375/267 |
| 2016/0036511 A1* | 2/2016 | Ko ........................ | H04W 72/21 370/252 |

(Continued)

FOREIGN PATENT DOCUMENTS

WO    2020125511 A1    6/2020

OTHER PUBLICATIONS

English translation of international search report (ISR) for PCT/CN2021/116159; mail date Nov. 25, 2021 (Year: 2021).*

*Primary Examiner* — Benjamin H Elliott, IV
(74) *Attorney, Agent, or Firm* — Maier & Maier, PLLC

(57) ABSTRACT

A channel measurement method includes: receiving a plurality of reference signals in a plurality of first frequency domain units in a same time domain unit, where the plurality of reference signals may be respectively precoded by using precoding matrices corresponding to the first frequency domain units in which the plurality of reference signals are located, and precoding matrices corresponding to at least two different first frequency domain units in the plurality of first frequency domain units are different; generating a precoding matrix indicator (PMI) based on the plurality of reference signals, where the PMI indicates a plurality of codewords corresponding to a plurality of second frequency domain units, the plurality of second frequency domain units and the plurality of first frequency domain units belong to a same frequency domain resource, and the plurality of codewords may be used for determining a downlink channel; and sending the PMI.

8 Claims, 8 Drawing Sheets

(58) Field of Classification Search
CPC ....... H04L 5/0048; H04L 5/14; H04B 17/309; H04B 7/0456
See application file for complete search history.

(56) References Cited

U.S. PATENT DOCUMENTS

| | | | |
|---|---|---|---|
| 2017/0141827 A1* | 5/2017 | Liu | H04B 7/0479 |
| 2017/0155435 A1* | 6/2017 | Zhu | H04B 7/0452 |
| 2018/0076943 A1* | 3/2018 | Clerckx | H04B 7/065 |
| 2018/0343046 A1* | 11/2018 | Park | H04B 7/06 |
| 2019/0020386 A1* | 1/2019 | Park | H04W 76/27 |
| 2019/0089437 A1* | 3/2019 | Chen | H04B 7/0456 |
| 2019/0173538 A1* | 6/2019 | Wu | H04B 7/0626 |
| 2019/0222288 A1* | 7/2019 | Zhou | H04L 5/0044 |
| 2020/0178096 A1* | 6/2020 | Chen | H04L 1/0026 |
| 2021/0314035 A1* | 10/2021 | Jin | H04B 17/364 |
| 2023/0155646 A1 | 5/2023 | Jin et al. | |
| 2023/0155765 A1* | 5/2023 | Zhang | H04L 5/0012 |
| | | | 370/329 |
| 2023/0261704 A1* | 8/2023 | Meng | H04B 17/309 |
| | | | 370/329 |

\* cited by examiner

CHANNEL MEASUREMENT METHOD AND PRECODING METHOD AND APPARATUS

CROSS-REFERENCE TO RELATED APPLICATIONS

This application is a continuation of International Application No. PCT/CN2021/116159, filed on Sep. 2, 2021, which claims priority to Chinese Patent Application No. 202011141660.3, filed on Oct. 22, 2020. The disclosures of the aforementioned applications are herein incorporated by reference in their entireties.

TECHNICAL FIELD

The embodiments relate to the communication field, a channel measurement method, and a communication apparatus.

BACKGROUND

In a massive multiple-input multiple-output (Massive MIMO) technology, a network device may reduce interference between a plurality of users and interference between a plurality of signal streams of a same user through precoding. This helps improve signal quality, implement spatial division multiplexing, and improve spectrum utilization.

Currently, a channel measurement method is known. A network device sends a downlink channel state information reference signal (CSI-RS), and a terminal device estimates a downlink channel based on the received downlink CSI-RS, then selects, from a predefined codebook set, a codeword that best matches the downlink channel, and finally feeds back the selected codeword to the network device over an uplink channel. However, limited by feedback overheads, the codebook set may be in a discrete and finite state, but a real channel may be in a continuous and infinite state. Therefore, an inevitable quantization error exists between a codebook and the real channel. This becomes a bottleneck that restricts a network device from improving precision of downlink channel state information (CSI).

SUMMARY

The embodiments may provide a channel measurement method and a communication apparatus. A downlink channel may be determined by combining codebook feedbacks on a plurality of time-frequency blocks, improving precision of the determined downlink channel.

According to a first aspect, a channel measurement method is provided. The method may include: receiving a plurality of reference signals in a plurality of first frequency domain units in a same time domain unit, where the plurality of reference signals may be respectively precoded by using precoding matrices corresponding to the first frequency domain units in which the plurality of reference signals may be located, and precoding matrices corresponding to at least two different first frequency domain units in the plurality of first frequency domain units are different; generating a precoding matrix indicator (PMI) based on the plurality of reference signals, where the PMI indicates a plurality of codewords corresponding to a plurality of second frequency domain units, the plurality of second frequency domain units and the plurality of first frequency domain units belong to a same frequency domain resource, and the plurality of codewords may be used for determining a downlink channel; and sending the PMI.

Different precoding matrices are loaded for reference signals in at least two different frequency domain units in a same time domain unit, so that correlation between channels in the different frequency domain units can be reduced, and correlation between errors of quantization feedback performed on codewords in the different frequency domain units by a terminal device can be further reduced. Therefore, precision of reconstructing the downlink channel can be improved.

According to a second aspect, a channel measurement method is provided. The method may include: sending a plurality of reference signals in a plurality of first frequency domain units in a same time domain unit, where the plurality of reference signals may be respectively precoded by using precoding matrices corresponding to the first frequency domain units in which the plurality of reference signals may be located, and precoding matrices corresponding to at least two different first frequency domain units in the plurality of first frequency domain units are different; receiving a PMI, where the PMI indicates a plurality of codewords corresponding to a plurality of second frequency domain units, and the plurality of second frequency domain units and the plurality of first frequency domain units belong to a same frequency domain resource; and determining a downlink channel based on the plurality of codewords and a spatial frequency domain channel characteristic matrix of an uplink channel.

The spatial frequency domain channel characteristic matrix of the uplink channel is determined based on a channel matrix of the uplink channel and conjugate transpose of the channel matrix.

Different precoding matrices are loaded for reference signals in at least two different frequency domain units in a same time domain unit, so that correlation between channels in the different frequency domain units can be reduced, and correlation between errors of quantization feedback performed on codewords in the different frequency domain units by a terminal device can be further reduced. Therefore, precision of reconstructing the downlink channel can be improved.

The time domain unit may be a radio frame, a sub-frame, a slot, or the like.

The first frequency domain unit may be a subband, a resource block (RB), a resource block group (RBG), a precoding resource block group (PRG), or the like.

The second frequency domain unit may be a subband, an RB, an RBG, a PRG, or the like.

For example, if the first frequency domain unit is a subband, the different precoding matrices may be respectively loaded for reference signals on at least two different subbands in the same time domain unit. Correspondingly, the second frequency domain unit may be an RB and the terminal device may perform codebook quantization feedback based on the RB. Alternatively, the second frequency domain unit may be the subband and the terminal device may perform codebook quantization feedback based on the subband.

The frequency domain resource may be an RB, an RBG, a predefined subband, a frequency band, a bandwidth part (BWP), or a component carrier (CC).

That the plurality of second frequency domain units and the plurality of first frequency domain units belong to a same frequency domain resource may be understood as that a frequency domain resource including the plurality of second frequency domain units is the same as a frequency domain resource including the plurality of first frequency domain units. For example, the first frequency domain unit is an RB, and the second frequency domain unit is an RBG. If there are 12 first frequency domain units, the frequency domain resource including the plurality of first frequency domain units is 12 RBs and is denoted as an RB #1 to an RB #12. Correspondingly, the frequency domain resource including the plurality of second frequency domain units is also 12 RBs and is denoted as the RB #1 to the RB #12. For another example, if a bandwidth including the plurality of first frequency domain units is 15 Hz, a bandwidth including the plurality of second frequency domain units is also 15 Hz.

With reference to the second aspect, in some implementations of the second aspect, the determining a downlink channel based on the plurality of codewords and a spatial frequency domain channel characteristic matrix of an uplink channel includes: obtaining a first downlink channel based on the plurality of codewords and the spatial frequency domain channel characteristic matrix, where the first downlink channel is an angle-delay domain channel; and obtaining a second downlink channel based on the first downlink channel and the spatial frequency domain channel characteristic matrix, where the second downlink channel is a spatial frequency domain channel.

Codebook feedbacks on a plurality of time-frequency blocks are combined in angle-delay domain by using sparsity of the downlink channel in angle-delay domain, to reconstruct the downlink channel, and then the angle-delay domain channel is transformed to the spatial frequency domain channel. This can reduce complexity of reconstructing the downlink channel and improve performance of reconstructing the downlink channel.

With reference to the first aspect or the second aspect, in some implementations of the first aspect or the second aspect, precoding matrices respectively corresponding to any two different first frequency domain units are different.

With reference to the first aspect or the second aspect, in some implementations of the first aspect or the second aspect, the plurality of first frequency domain units may be divided into at least two frequency domain unit groups, and precoding matrices respectively corresponding to the at least two frequency domain unit groups are different.

For example, the first frequency domain unit is an RB, and the frequency domain unit group is a subband.

With reference to the first aspect or the second aspect, in some implementations of the first aspect or the second aspect, precoding matrices respectively corresponding to any two different frequency domain unit groups are different.

With reference to the first aspect or the second aspect, in some implementations of the first aspect or the second aspect, the precoding matrix is a random semi-unitary matrix.

With reference to the first aspect or the second aspect, in some implementations of the first aspect or the second aspect, the precoding matrix is a product of a fixed beam matrix and a mutually unbiased bases MUB (MUB) matrix, and the fixed beam matrix is a semi-unitary matrix whose different columns have a same beam directivity pattern.

According to a third aspect, a channel measurement method is provided. The method may include: receiving a plurality of reference signals in a plurality of first frequency domain units in a same time domain unit; generating a PMI based on the plurality of reference signals and a weighting matrix, where the PMI indicates a plurality of codewords corresponding to weighted equivalent channels of a plurality of second frequency domain units, the plurality of codewords are used for determining a downlink channel, the weighted equivalent channel of each second frequency domain unit is obtained based on the weighting matrix corresponding to the second frequency domain unit, weighting matrices corresponding to at least two different second frequency domain units in the plurality of second frequency domain units are different, and the plurality of second frequency domain units and the plurality of first frequency domain units belong to a same frequency domain resource; and sending the PMI.

Different weighting matrices are loaded for equivalent channels in the at least two different second frequency domain units, so that correlation between channels in the different second frequency domain units can be reduced, and correlation between errors of quantization feedback performed on codewords in the different second frequency domain units by a terminal device can be further reduced. Therefore, precision of reconstructing the downlink channel can be improved.

According to a fourth aspect, a channel measurement method is provided. The method may include: sending a plurality of reference signals in a plurality of first frequency domain units in a same time domain unit; receiving a PMI, where the PMI indicates a plurality of codewords corresponding to weighted equivalent channels of a plurality of second frequency domain units, the plurality of codewords are used for determining a downlink channel, the weighted equivalent channel of each second frequency domain unit is obtained based on a weighting matrix corresponding to the second frequency domain unit, weighting matrices corresponding to at least two different second frequency domain units in the plurality of second frequency domain units are different, and the plurality of second frequency domain units and the plurality of first frequency domain units belong to a same frequency domain resource; and determining the downlink channel based on the plurality of codewords and a spatial frequency domain channel characteristic matrix of an uplink channel.

The spatial frequency domain channel characteristic matrix of the uplink channel is determined based on a channel matrix of the uplink channel and conjugate transpose of the channel matrix.

Different weighting matrices are loaded for equivalent channels in the at least two different second frequency domain units, so that correlation between channels in the different second frequency domain units can be reduced, and correlation between errors of quantization feedback performed on codewords in the different second frequency domain units by a terminal device can be further reduced. Therefore, precision of reconstructing the downlink channel can be improved.

The time domain unit may be a radio frame, a sub-frame, a slot, or the like.

The first frequency domain unit may be a subband, an RB, an RBG, a PRG, or the like.

The second frequency domain unit may be a subband, an RB, an RBG, a PRG, or the like.

For example, the second frequency domain unit may be an RB, the terminal device may perform codebook quantization feedback based on the RB, and the terminal device may perform codebook quantization feedback based on a weighted equivalent channel of each RB, and weighting matrices corresponding to at least two RBs are different. Alternatively, the second frequency domain unit may be a subband, the terminal device may perform codebook quantization feedback based on the subband, and the terminal device may perform codebook quantization feedback based on a weighted equivalent channel of each subband, and weighting matrices corresponding to at least two subbands are different.

The frequency domain resource may be an RB, an RBG, a predefined subband, a frequency band, a BWP, or a CC.

That the plurality of second frequency domain units and the plurality of first frequency domain units belong to a same frequency domain resource may be understood as that a frequency domain resource including the plurality of second frequency domain units is the same as a frequency domain resource including the plurality of first frequency domain units. For example, the first frequency domain unit is an RB, and the second frequency domain unit is an RBG. If there are 12 first frequency domain units, the frequency domain resource including the plurality of first frequency domain units is 12 RBs and is denoted as an RB #1 to an RB #12. Correspondingly, the frequency domain resource including the plurality of second frequency domain units is also 12 RBs and is denoted as the RB #1 to the RB #12. For another example, if a bandwidth including the plurality of first frequency domain units is 15 Hz, a bandwidth including the plurality of second frequency domain units is also 15 Hz.

With reference to the fourth aspect, in some implementations of the fourth aspect, the determining the downlink channel based on the plurality of codewords and a spatial frequency domain channel characteristic matrix of an uplink channel includes: obtaining a first downlink channel based on the plurality of codewords and the spatial frequency domain channel characteristic matrix, where the first downlink channel is an angle-delay domain channel; and obtaining a second downlink channel based on the first downlink channel and the spatial frequency domain channel characteristic matrix, where the second downlink channel is a spatial frequency domain channel.

Codebook feedbacks on a plurality of time-frequency blocks are combined in angle-delay domain by using sparsity of the downlink channel in angle-delay domain, to reconstruct the downlink channel, and then the angle-delay domain channel is transformed to the spatial frequency domain channel. This can reduce complexity of reconstructing the downlink channel and improve performance of reconstructing the downlink channel.

With reference to the third aspect or the fourth aspect, in some implementations of the third aspect or the fourth aspect, weighting matrices corresponding to any two different second frequency domain units are different.

With reference to the third aspect or the fourth aspect, in some implementations of the third aspect or the fourth aspect, the plurality of second frequency domain units may be divided into at least two frequency domain unit groups, and weighting matrices corresponding to the at least two frequency domain unit groups are different.

For example, the second frequency domain unit is an RB, and the frequency domain unit group is a subband.

With reference to the third aspect or the fourth aspect, in some implementations of the third aspect or the fourth aspect, weighting matrices corresponding to any two different frequency domain unit groups are different.

With reference to the third aspect or the fourth aspect, in some implementations of the third aspect or the fourth aspect, the plurality of reference signals may be separately precoded by using a fixed beam matrix, the fixed beam matrix is a semi-unitary matrix whose different columns have a same beam directivity pattern, and the weighting matrix is an MUB matrix.

According to a fifth aspect, a communication apparatus is provided. The communication apparatus may be a terminal device or a component in the terminal device. The communication apparatus may include modules or units configured to perform the method in any one of the first aspect or the third aspect and the possible implementations of the first aspect or the third aspect.

According to a sixth aspect, a communication apparatus is provided. The communication apparatus includes a processor. The processor is coupled to a memory and may be configured to execute instructions in the memory, to implement the method in any one of the first aspect or the third aspect and the possible implementations of the first aspect or the third aspect. Optionally, the communication apparatus further includes the memory. Optionally, the communication apparatus further includes a communication interface, the processor is coupled to the communication interface, the communication interface is configured to input and/or output information, and the information includes at least one of instructions and data.

In an implementation, the communication apparatus is a terminal device. When the communication apparatus is the terminal device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in the terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a seventh aspect, a communication apparatus is provided. The communication apparatus may be a network device or a component in the network device. The communication apparatus may include modules or units configured to perform the method in any one of the second aspect or the fourth aspect and the possible implementations of the second aspect or the fourth aspect.

According to an eighth aspect, a communication apparatus is provided. The communication apparatus includes a processor. The processor is coupled to a memory and may be configured to execute instructions in the memory, to implement the method in any one of the second aspect or the fourth aspect and the possible implementations of the second aspect or the fourth aspect. Optionally, the communication apparatus further includes the memory. Optionally, the communication apparatus further includes a communication interface, the processor is coupled to the communication interface, the communication interface is configured to input and/or output information, and the information includes at least one of instructions and data.

In an implementation, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in the network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a ninth aspect, a processor is provided. The processor includes: an input circuit, an output circuit, and a processing circuit. The processing circuit is configured to: receive a signal$^{th}$ rough the input circuit, and transmit a signal$^{th}$ rough the output circuit, to enable the processor to perform the method in any possible implementation of the first aspect to the fourth aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the various circuits are not limited in the embodiments.

According to a tenth aspect, a processing apparatus is provided. The processing apparatus includes a communication interface and a processor. The communication interface is coupled to the processor. The communication interface is configured to input and/or output information. The information includes at least one of instructions and data. The processor is configured to execute a computer program, to enable the processing apparatus to perform the method in any possible implementation of the first aspect to the fourth aspect.

Optionally, there are one or more processors, and there are one or more memories.

According to an eleventh aspect, a processing apparatus is provided. The processing apparatus includes a processor and a memory. The processor is configured to read instructions stored in the memory, and may receive a signal$^{th}$ rough a receiver, and transmit a signal$^{th}$ rough a transmitter, to enable the processing apparatus to perform the method in any possible implementation of the first aspect to the fourth aspect.

Optionally, there are one or more processors, and there are one or more memories.

Optionally, the memory may be integrated with the processor, or the memory and the processor are separately disposed.

In an implementation process, the memory may be a non-transitory memory, for example, a read-only memory (ROM). The memory and the processor may be integrated on a same chip or may be separately disposed on different chips. A type of the memory and a manner in which the memory and the processor are disposed are not limited in the embodiments.

It should be understood that in a related information exchange process, for example, sending indication information may be a process of outputting the indication information from the processor, and receiving the indication information may be a process of inputting the received indication information to the processor. The information output by the processor may be output to the transmitter, and the input information received by the processor may be from the receiver. The transmitter and the receiver may be collectively referred to as a transceiver.

The apparatuses in the tenth aspect and the eleventh aspect may be chips. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated in the processor or may be located outside the processor and exist independently.

According to a twelfth aspect, a computer program product is provided. The computer program product includes a computer program (which may also be referred to as code or instructions). When the computer program is run, a computer is enabled to perform the method in any one of the possible implementations of the first aspect to the fourth aspect.

According to a thirteenth aspect, a computer-readable medium is provided. The computer-readable medium stores a computer program (which may also be referred to as code or instructions). When the computer program is run on a computer, the computer is enabled to perform the method in any one of the possible implementations of the first aspect to the fourth aspect.

According to a fourteenth aspect, a communication system is provided. The communication system includes the foregoing terminal device and the foregoing network device.

DETAILED DESCRIPTION OF THE EMBODIMENTS

Figure 1:
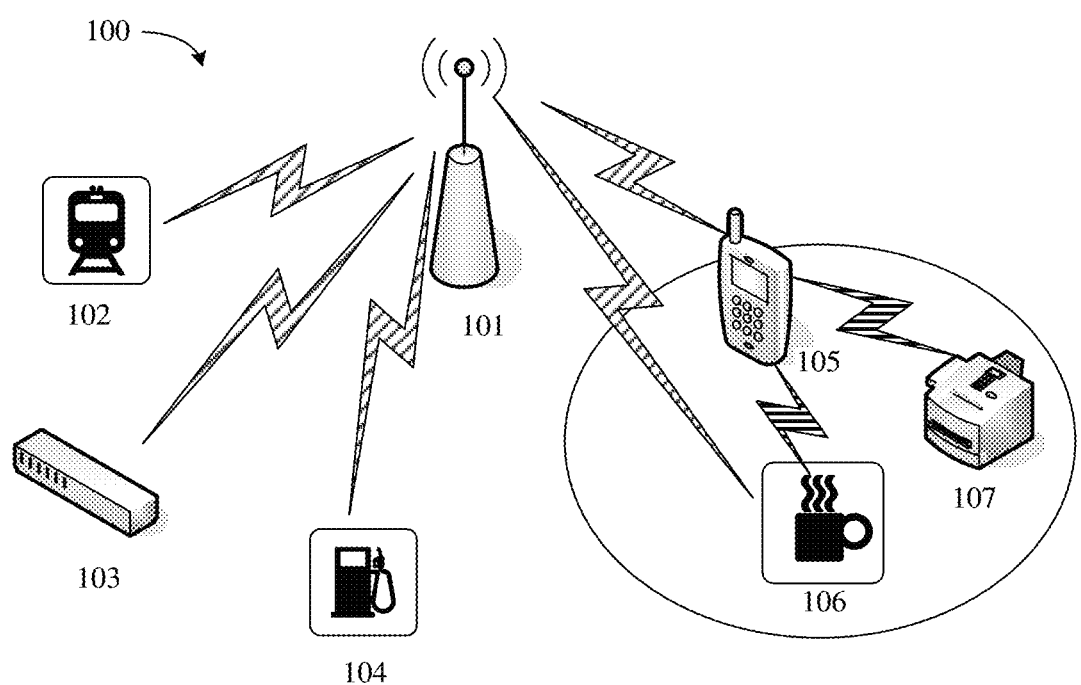
FIG. 1 is a schematic diagram of a communication system to which a channel measurement method according to an embodiment is applicable.

The following describes the embodiments with reference to accompanying drawings.

The embodiments may be applied to various communication systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5$^{th}$ generation (5G) mobile communication system, or a new radio access technology (NR) system. The 5G mobile communication system may include a non-standalone (NSA) network and/or a standalone (SA) network.

The embodiments may be further applied to machine type communication (MTC), a long term evolution-machine (LTE-M) technology, a device-to-device (D2D) network, a machine-to-machine (M2M) network, an Internet of Things (IoT) network, or another network. The IoT network may include, for example, an internet of vehicles. Communication modes in an internet of vehicles system are collectively referred to as vehicle-to-X (vehicle-to-X, V2X, where X may represent anything). For example, the V2X may include vehicle-to-vehicle (V2V) communication, vehicle-to-infrastructure (V2I) communication, vehicle-to-pedestrian (V2P) communication, or vehicle-to-network (V2N) communication.

The embodiments may be further applied to a future communication system, for example, a $6^{th}$ generation mobile communication system. This is not limited.

In the embodiments, a network device may be any device having a wireless transceiver function. The device includes, but is not limited to, an evolved NodeB (eNB), a radio network controller (RNC), a NodeB (NB), a base station controller (BSC), a base transceiver station (BTS), a home base station (HNB), a baseband unit (BBU), an access point (AP) in a wireless fidelity (Wi-Fi) system, a wireless relay node, a wireless backhaul node, a transmission point (TP), a transmission and reception point (TRP), or the like; or may be a gNB or a transmission point (TRP or TP) in a 5G system, for example, an NR system, or one antenna panel or one group of antenna panels (including a plurality of antenna panels) of a gNodeB in a 5G system; or may be a network node forming a gNB or a transmission point, for example, a baseband unit (BBU) or a distributed unit (DU).

In some deployments, the gNB may include a central unit (CU) and a DU. The gNB may further include an active antenna unit (AAU). The CU implements some functions of the gNB, and the DU implements some functions of the gNB. For example, the CU is responsible for processing a non-real-time protocol and service, to implement functions of a radio resource control (RRC) layer and a packet data convergence protocol (PDCP) layer. The DU is responsible for processing a physical layer protocol and a real-time service, to implement functions of a radio link control (RLC) layer, a medium access control (MAC) layer, and a physical (PHY) layer. The AAU implements some physical layer processing functions, a radio frequency processing function, and a function related to an active antenna. Information at the RRC layer is eventually converted into information at the PHY layer or is converted from the information at the PHY layer. Therefore, in this architecture, higher layer signaling, for example, RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified Into a network device in a core net'ork (CN). This's not limited.

The network device provides a service for a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power and are applicable to providing a high-rate data transmission service.

In the embodiments, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device having a wireless connection function or a vehicle-mounted device. Currently, some examples of the terminal may be: a mobile phone, a tablet computer (pad), a computer (for example, a notebook computer or a palmtop computer) having a wireless transceiver function, a mobile Internet device (MID), a virtual reality (VR) device, an augmented reality (AR) device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a 5G network, or a terminal device in a future evolved public land mobile network (PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data interaction, and cloud interaction. In a broad sense, the wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device may alternatively be a terminal device in an internet of things (IoT) system. An IoT is an important part in future information technology development. An object may be connected to a network by using a communication technology, to implement an intelligent network for human-machine interconnection and thing-thing interconnection. An IoT technology can achieve massive connections, deep coverage, and terminal power saving by using, for example, a narrowband (NB) technology.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

For ease of understanding of the embodiments, a communication system to which a channel measurement method provided in the embodiments is applicable is first described in detail with reference to FIG. 1. FIG. 1 is a schematic diagram of a communication system 100 to which the method according to an embodiment is applicable. As shown in the figure, the communication system 100 may include at least one network device, such as a network device 101 shown in FIG. 1. The communication system 100 may further include at least one terminal device, such as terminal devices 102 to 107 shown in FIG. 1. The terminal devices 102 to 107 may be movable or fixed. The network device 101 may communicate with one or more of the terminal devices 102 to 107 through a radio link. Each network device may provide communication coverage for a particular geographic area and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 form a communication system.

Optionally, the terminal devices may directly communicate with each other. For example, direct communication between the terminal devices may be implemented by using a D2D technology. For example, terminal devices 105 and 106 in the figure may directly communicate with the network device 101 or may indirectly communicate with the network device 101. For example, the terminal device 107 in the figure communicates with the network device 101 by using the terminal device 105.

It should be understood that FIG. 1 shows an example of one network device, a plurality of terminal devices, and communication links between the communication devices. Optionally, the communication system 100 may include a plurality of network devices, and another quantity of terminal devices, for example, more or fewer terminal devices may be included in coverage of each network device. This is not limited.

A plurality of antennas may be configured for each of the foregoing communication devices, for example, the network device 101 and the terminal devices 102 to 107 in FIG. 1. The plurality of antennas may include at least one transmit antenna for sending a signal and at least one receive antenna for receiving a signal. In addition, each of the communication devices further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

Optionally, the wireless communication system 100 may further include another network entity, for example, a network controller or a mobility management entity. This is not limited in the embodiments.

In a multi-antenna system, a plurality of transceiver antennas may be disposed in the network device, and a system capacity is improved by exploiting and using a spatial dimension resource. A key factor for improving a downlink capacity of the multi-antenna system is to obtain accurate downlink channel state information (CSI) at a network device end. A TDD system obtained through channel calibration can estimate downlink CSI based on an uplink sounding reference signal (SRS) sent by a user due to reciprocity between uplink and downlink channels. In an FDD system, there is a difference between uplink and downlink frequency bands, and there is no channel reciprocity. Therefore, downlink CSI can be fed back only by the terminal device to the network device. In addition, if a channel in the TDD system is not calibrated, an equivalent baseband channel between the network device and the terminal device does not have reciprocity. Therefore, the downlink CSI also needs to be fed back by the terminal device to the network device.

In a downlink CSI feedback procedure, the network device first sends a downlink channel state information reference signal (CSI-RS), and the terminal device estimates a downlink channel based on the received downlink CSI-RS, then selects, from a predefined codebook set, a codeword that best matches the downlink channel, and finally feeds back the selected codeword to the network device over an uplink channel. Limited by uplink feedback overheads, the codebook set may be in a discrete and finite state, but a real channel may be in a continuous and infinite state. Therefore, an inevitable quantization error exists between a codebook and the real channel. This becomes a bottleneck that restricts the network device end from improving precision of the downlink CSI. A radio channel may have time correlation and frequency correlation. Therefore, codebook feedbacks on a plurality of time-frequency blocks may be jointly used at the network device end, to jointly reconstruct channels on these time-frequency blocks, to improve the precision of the downlink CSI.

Currently, an existing solution for reconstructing a downlink channel by using time correlation of a channel is as follows: When sending the downlinkCSI-RS, the network device weights the downlink CSI-RS by using a pilot weighting matrix, the weighting matrix changes at different moments (in downlink CSI-RS sub-frames), and weighting matrices on all resource blocks (RBs) in a full band in a same downlink CSI-RS sub-frame are the same. The terminal device performs channel estimation based on the received downlink CSI-RS, where an obtained channel estimation result is an equivalent channel obtained by weighting a real channel, performs codebook quantization on the equivalent channel, and then feeds back a codebook to the network device. The network device reconstructs real downlink CSI with reference to a corresponding pilot weighting matrix fed back by the terminal device each time. The downlink CSI reconstructed by the network device may be used for downlink multi-user scheduling, beamforming sending, and the like.

In the foregoing channel reconstruction solution, in principle, only the time correlation of the channel is used, but frequency correlation of the channel is not used. Even if the terminal device performs subband feedback, the network device reconstructs subband channels independently, but does not perform joint reconstruction between the subband channels. Therefore, performance is to be improved. In addition, when the network device sends the downlink CSI-RS, a same weighting matrix is used in the full band. Even if the terminal device performs subband feedback, correlation of a codebook quantization error between the subbands is very high. Therefore, no gain is brought when the network device performs inter-subband joint reconstruction.

In view of this, the embodiments may provide a channel measurement method, to improve precision of reconstructing a downlink channel by a network device.

The following describes in detail $^{th}$ e method provided in the embodiments with reference to the accompanying drawings.

It should be understood that for ease of understanding and description only, interaction between a terminal device and a network device is used as an example below to describe in detail$^{th}$ e method provided in the embodiments. However, this should not constitute any limitation on an execution body of the method. For example, the terminal device shown in the following embodiments may be replaced with a component (for example, a circuit, a chip, or a chip system) disposed in the terminal device. The network device shown in the following embodiments may be replaced with a component (for example, a circuit, a chip, or a chip system) disposed in the network device.

A structure of the execution body of the method is not particularly limited in the following embodiments, provided that a program that records code of the method provided in the embodiments can be run, to perform communication according to the method provided in the embodiments. For example, the method provided in the embodiments may be performed by a terminal device or a network device or may be a functional module that is in the terminal device or the network device and that can invoke and execute a program.

Figure 2:
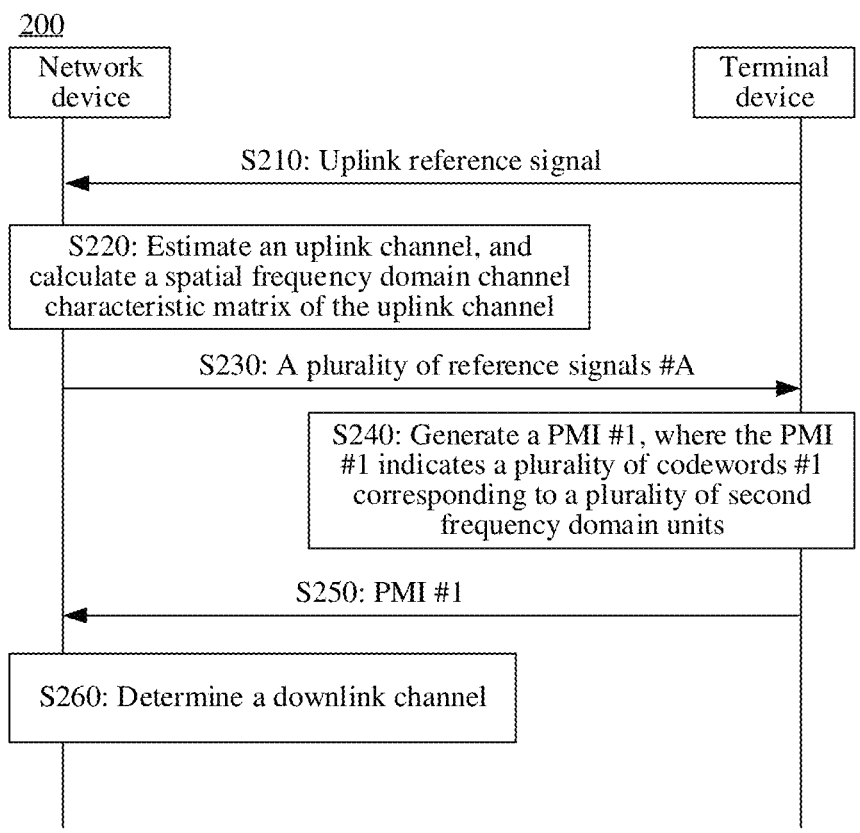
FIG. 2 is a schematic flowchart of a channel measurement method according to an embodiment.

The following describes in detail$^{th}$ e channel measurement method provided in the embodiments with reference to the accompanying drawings. FIG. 2 is a schematic flowchart of a channel measurement method 200 according to an embodiment. As shown in FIG. 2, the method 200 may include S210 to S260. The following describes in detail steps in the method 200.

S210: A terminal device sends an uplink reference signal. Correspondingly, in S210, a network device receives the uplink reference signal.

The uplink reference signal sent by the terminal device to the network device may be used for measuring an uplink channel. The uplink reference signal may be a sounding reference signal (SRS) or may be another reference signal. This is not limited in the embodiments.

Ie terminal device may periodically send the uplink reference signal to the network device.

S220: The network device estimates the uplink channel based on the uplink reference signal and calculates a spatial frequency domain channel characteristic matrix of the uplink channel.

_or For a method for estimating the uplink channel by the network device based on the uplink reference signal, refer to the conventional technology. For brevity, details are not described in the embodiments.

The following describes a method for calculating the spatial frequency domain channel characteristic matrix by the network device based on the estimated uplink channel.

For ease of understanding, it is assumed that there are $M_t$ antennas at a network device end, $M_r$ antennas at a terminal device end, and K frequency domain units (for example, RBs). For a $r^{th}$ transmit antenna of the terminal device, the network device estimates that an uplink channel from the $r^{th}$ transmit antenna to all antennas of the network device on the $k^{th}$ RB may be denoted as $\overline{h_{ul,k}^r}$, where k=1,2, . . . , K, r=1, 2, . . . , $M_r$, and a dimension of $\overline{h_{ul,k}^r}$ is $m_t \times 1$. It may be understood that each time the network device receives an uplink reference signal from the terminal device, the network device may calculate one $\overline{h_{ul,k}^r}$ based on the uplink reference signal.

In an example, the network device splices uplink channels on all RBs from the $r^{th}$ transmit antenna of the terminal device to all antennas of the network device into a column vector, and the column vector is denoted as $\overline{h_{ul}^r}=\text{vec}([\overline{h_{ul,1}^r}, \overline{h_{ul,2}^r}, \ldots, \overline{h_{ul,k}^r}])$, were vec (□) indicates a vectorization operation, and a dimension of $\overline{h_{ul}^r}$ is $=M_tK\times 1$. Further, the network device calculates $\overline{h_{ul}^r h_{ul}^{rH}}$, and performs statistical average on $\overline{h_{ul}^r h_{ul}^{rH}}$ on all transmit antennas of the terminal device and time, to obtain a long-term statistical spatial frequency domain joint channel covariance matrix R of the terminal device, and a dimension of R is $M_tK\times M_tK$.

For example, if the terminal device has only one transmit antenna, the network device performs statistical average on a plurality of $\overline{h_{ul}^1 h_{ul}^{1H}}$ obtained, within a period of time, based on the plurality of uplink reference signals from the terminal device, to obtain a long-term statistical spatial frequency domain joint channel covariance matrix R of the terminal device.

For another example, if the terminal device has a plurality of transmit antennas, the network device may first perform statistical average on $\overline{h_{ul}^r h_{ul}^{rH}}$ on all transmit antennas of the terminal device, to obtain $$\overline{h_{ul}h_{ul}}^H = \frac{1}{M_r}\left(\overline{h_{ul}^1 h_{ul}^1}^H + \overline{h_{ul}^2 h_{ul}^2}^H + \ldots + \overline{h_{ul}^{Mr} h_{ul}^{Mr}}^H\right).$$

Further, the network device performs statistical average on a plurality of $\overline{h_{ul}h_{ul}}^H$ obtained, within the period of time, based on the plurality of uplink reference signals from the terminal device, to obtain the long-term statistical spatial frequency domain joint channel covariance matrix R of the terminal device.

It should be understood that the foregoing method in which the network device performs statistical average on $\overline{h_{ul}^r h_{ul}^{rH}}$ on all transmit antennas of the terminal device and time is merely an example and should not constitute a limitation on the embodiments. For example, the network device may alternatively perform statistical average on a plurality of $\overline{h_{ul}^1 h_{ul}^{1H}}$, a plurality oI, . . . , and a plurality of $\overline{h_{ul}^{Mr} h_{ul}^{Mr}}$ obtained, within the period of time, based on the plurality of uplink reference signals from the terminal device, to obtain the long-term statistical spatial frequency domain joint channel covariance matrix R of the terminal device.

Further, the network device calculates low-rank approximation of R, to obtain a spatial frequency domain channel characteristic matrix P, namely, R≈PP$^H$, where a dimension of P is $M_tK\times N$ and N is far less than $M_tK$. For a method for calculating the low-rank approximation of the matrix, refer to the conventional technology.

In another example, the network device splices the uplink channels on all RBs from the $r^{th}$ transmit antenna of the terminal device to all antennas of the network device into a matrix, and the matrix is denoted as $\overline{h_{ul}^r}=[\overline{h_{ul,1}^r}, \overline{h_{ul,2}^r}, \ldots, \overline{h_{ul,k}^r}]$, where a dimension of $\overline{h_{ul}^r}$ is $M_t\times K$. Further, the network device separately calculates $\overline{h_{ul}^r h_{ul}^{rH}}$ and $\overline{h_{ul}^r h_{ul}^r}$, and performs statistical average on $\overline{h_{ul}^r h_{ul}^{rH}}$ and $\overline{h_{ul}^r h_{ul}^r}$ on all transmit antennas of the terminal device and time, to respectively obtain a long-term statistical spatial domain channel covariance matrix $R_s$ and a frequency domain channel covariance matrix $R_f$ of the terminal device, and dimensions of $R_s$ and $R_f$ are respectively $M_t\times M_t$ and K×K.

For example, if the terminal device has only one transmit antenna, the network device performs statistical average on a plurality of $\overline{h_{ul}^1 h_{ul}^{1H}}$ obtained, within the period of time, based on the plurality of uplink reference signals from the terminal device, to obtain a long-term statistical spatial domain channel covariance matrix $R_s$ of the terminal device; and performs statistical average on a plurality of $\overline{H_{ul}^{1H}H_{ul}^1}$ obtained, within the period of time, based on the plurality of uplink reference signals from the terminal device, to obtain a long-term statistical frequency domain channel covariance matrix $R_f$ of the terminal device.

For another example, if the terminal device has a plurality of transmit antennas, the network device may first perform statistical average on $\overline{h_{ul}^r h_{ul}^{rH}}$ on all transmit antennas of the terminal device, to obtain $$\overline{H_{ul}H_{ul}}^H = \frac{1}{M_r}\left(\overline{H_{ul}^1 H_{ul}^1}^H + \overline{H_{ul}^2 H_{ul}^2}^H + \cdots + \overline{H_{ul}^{M_r} H_{ul}^{M_r}}^H\right);$$

and perform statistical average on $\overline{H_{ul}^{1H} H_{ul}^1}$ on all transmit antennas of the terminal device, to obtain $$\overline{H_{ul}}^H \overline{H_{ul}} = \frac{1}{M_r}\left(\overline{H_{ul}^1}^H \overline{H_{ul}^1} + \overline{H_{ul}^2}^H \overline{H_{ul}^2} + \cdots + \overline{H_{ul}^{M_r}}^H \overline{H_{ul}^{M_r}}\right).$$

Further, the network device performs statistical average on a plurality of $\overline{H_{ul}H_{ul}}^H$ obtained, within the period of time, based on the plurality of uplink reference signals from the terminal device, to obtain the long-term statistical spatial domain channel covariance matrix $R_s$ of the terminal device; and performs statistical average on a plurality of $\overline{H_{ul}}^H \overline{H_{ul}}$ obtained, within the period of time, based on the plurality of uplink reference signals from the terminal device, to obtain the long-term statistical frequency domain channel covariance matrix $R_f$ of the terminal device.

It should be understood that the foregoing method in which the network device performs statistical average on $\overline{H_{ul}H_{ul}}^H$ and $\overline{H_{ul}}^H \overline{H_{ul}}$ on all transmit antennas of the terminal device and time is merely an example and should not constitute a limitation on the embodiments. For example, the network device may alternatively perform statistical average on a plurality of $\overline{h_{ul}^1 h_{ul}^{1H}}$, a pluralitIf $\overline{h_{ul}^2 h_{ul}^{2H}}, \ldots$, and a plurality of $\overline{h_{ul}^{Mr} h_{ul}^{MrH}}$ obtained, within the period of time, based on the plurality of uplink reference signals from the terminal device, to obtain the long-term statistical spatial domain channel covariance matrix $R_s$; and perform statistical average on a plurality of $\overline{H_{ul}^{1H} H_{ul}^1}$, a plurality of $\overline{H_{ul}^{2H} H_{ul}^2}, \ldots$, and a plurality of $\overline{H_{ul}^{MrH} H_{ul}^{Mr}}$ obtained, within the period of time, based on the plurality of uplink reference signals from the terminal device, to obtain the long-term statistical frequency domain channel covariance matrix $R_f$.

Further, the network device separately calculates low-rank approximation of $R_s$ and $R_f$ to obtain a spatial domain channel characteristic matrix $P_s$ and a frequency domain channel characteristic matrix $P_f$, namely, $R_s=P_s P_s^H$ and $R_f=P_f P_f^H$, where a dimension of $P_s$ is $M_t \times N_s$ and a dimension of $P_f$ is $K \times N_f$. Further, the network device calculates, based on $P_s$ and $P_f$, a spatial frequency domain channel characteristic matrix P, namely, $P=P_f^* \otimes P_s$, where a dimension of P is $M_t K \times N$ and $N=N_s N_f$. For a method for calculating the low-rank approximation of the matrix, refer to the conventional technology.

S230: The network device sends a plurality of reference signals #A. Correspondingly, in S230, the terminal device receives the plurality of reference signals #A.

The plurality of reference signals #A may be reference signals in a plurality of first frequency domain units in a same time domain unit. The time domain unit in which the plurality of reference signals #A are located is denoted as a time domain unit #1 below. The plurality of reference signals #A may be respectively precoded by using precoding matrices #1 corresponding to the first frequency domain units in which the reference signals #A are located, and precoding matrices #1 corresponding to at least two different first frequency domain units are different. In other words, reference signals #A carried in the at least two different first frequency domain units are precoded by using the different precoding matrices #1.

Optionally, precoding matrices #1 corresponding to any two different first frequency domain units are different. In other words, reference signals #A carried in the any two different first frequency domain units are precoded by using the different precoding matrices #1.

The time domain unit #1 may be a radio frame, a sub-frame, a slot, or the like. This is not limited in the embodiments. An example in which the time domain unit #1 is a sub-frame is used below for description.

The first frequency domain unit may be a subband, a resource block (RB), a resource block group (RBG), a precoding resource block group (PRG), or the like. This is not limited in the embodiments.

Figure 3:
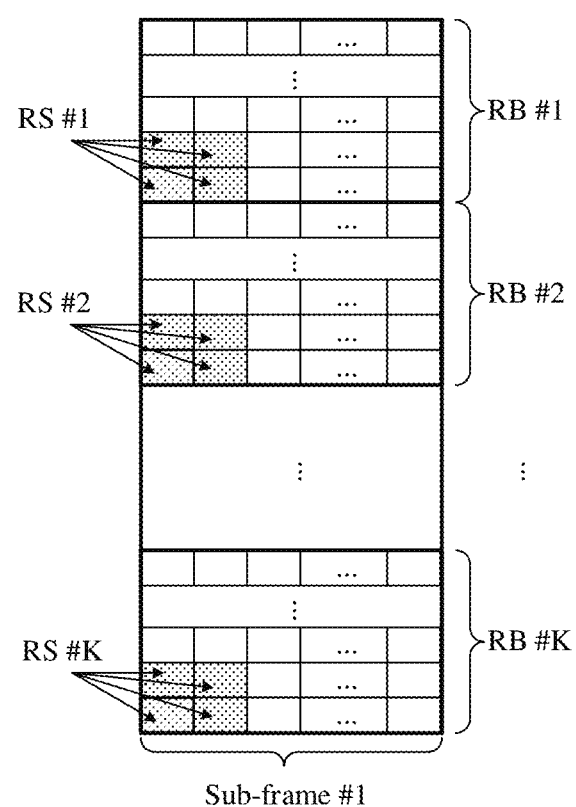
FIG. 3 Tis a schematic diagram of mapping reference signals to time-frequency resources according to an embodiment.

For example, the first frequency domain unit is an RB and there are K reference signals #A. FIG. 3 is a schematic diagram of mapping the K reference signals #A to a time domain resource. As shown in FIG. 3, the reference signals #A (an RS #1 to an RS #K) are all carried in a time domain unit #1 (a sub-frame #1), and any two of the reference signals #A (the RS #1 to the RS #K) are reference signals on different RBs. For example, the RS #1 is carried on an RB #1, the RS #2 is carried on an RB #2, . . . , and the RS #K is carried on an RB #K. In other words, any two of the RS #1 to the RS #K are reference signals on different RBs.

As shown in FIG. 3, any two of the K reference signals #A are reference signals on different RBs. In addition, precoding matrices #1 corresponding to at least two of the K reference signals #A are different. The RS #1 sent by the network device on the RB #1 is denoted as $B_1 X_1$, the RS #2 sent on the RB #2 is Ioted as $B_2 X_2, \ldots$, and the RS #K sent on the RB #K is denoted as $B_K X_K$, where $X_k$ and $B_k$ are respectively a reference signal before precoding and a precoding matrix #1 that correspond to the RS #k, where $k=1, 2, \ldots, K$, dimensions of $X_k$ and $B_k$ are respectively P×P and $M_t$×P, and P indicates a quantity of ports of the reference signals #A. It can be understood from the foregoing descriptions that at 1 eI two of $B_1, B_2, \ldots$, and $B_K$ are different. It may be understood that when P=1, and a dimension of Bk is Mt x1, Bk may be referred to as a precoding vector.

Optionally, precoding matrices #1 corresponding to any two of the K reference signals #A shown in FIG. 3 are different and Iany two of $B_1, B_2, \ldots$, and $B_K$ are different.

Figure 4:
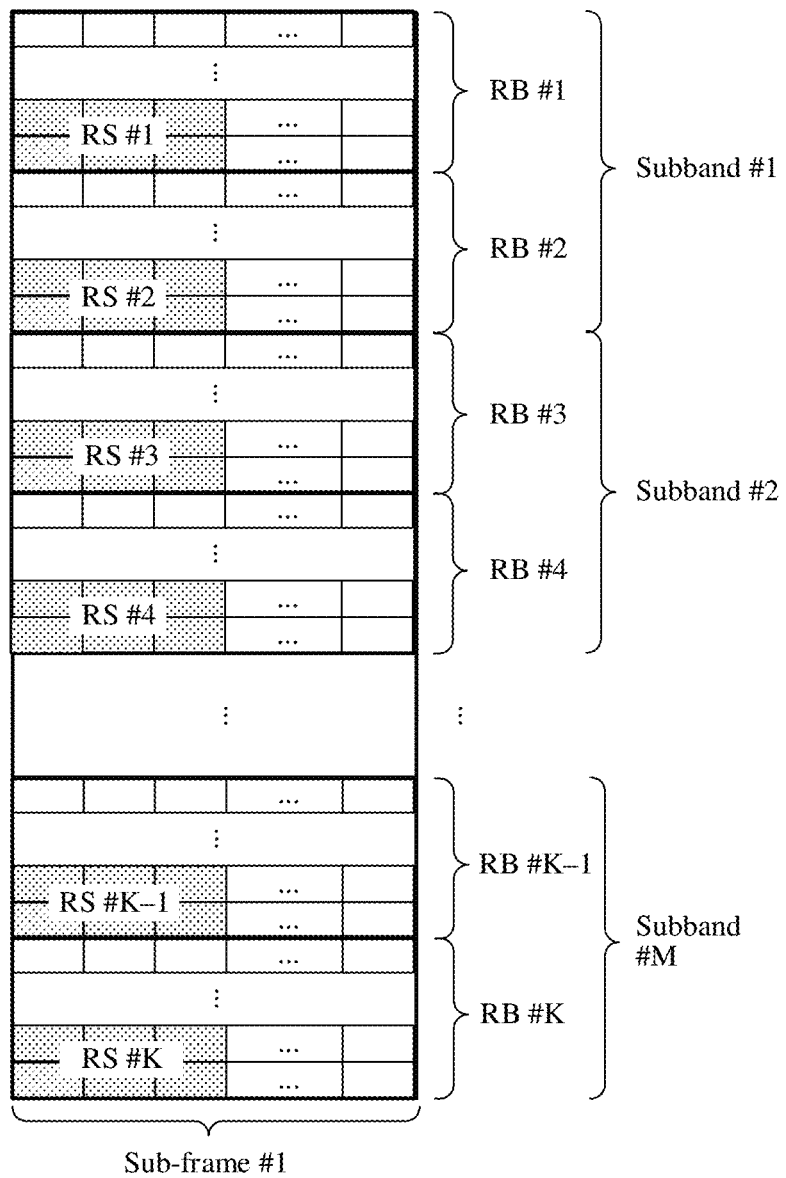
FIG. 4 is a schematic diagram of mapping reference signals to time-frequency resources according to an embodiment.

In another example, the first frequency domain unit may be a subband. For example, there are K reference signals #A. FIG. 4 is a schematic diagram of mapping the K reference signals #A to a time domain resource. As shown in FIG. 4, the reference signals #A (an RS #1 to an RS #K) are all carried in a time domain unit #1 (a sub-frame #1), and at least two of the reference signals #A (the RS #1 to the RS #K) are reference signals on different subbands. For example, the RS #1 is carried on a subband #1, and the RS #3 is carried on a subband #2. In other words, the RS #1 and the RS #3 are reference signals on different RBs.

As shown in FIG. 4, the at least two of the K reference signals #A are the reference signals on the different subbands. Correspondingly, in the K reference signals #A, precoding matrices #1 corresponding to reference signals #A on at least two different subbands are different. For example, precoding matrices #1 corresponding to reference signals #A on the subband #1 and the subband #2 may be different. For example, if the RS #1 and the RS #3 are respectively carried on the subband #1 and the subband #2, $B_1$ and $B_3$ respectively corresponding to the RS #1 and the RS #3 are different. In this case, the precoding matrix #1 corresponding to the subband #1 may be different from or the same as a precoding matrix #1 corresponding to a reference signal #A on a subband other than the subband #2. For example, the precoding matrix #1 corresponding to the subband #1 may be the same as or different from a precoding matrix #1 corresponding to a reference signal #A on a subband #M. The precoding matrix #1 corresponding to the subband #2 may be the same as or different from a precoding matrix #1 corresponding to a reference signal #A on a subband other than the subband #1. For example, the precoding matrix #1 corresponding to the subband #2 may be the same as or different from the precoding matrix #1 corresponding to the reference signal #A on the subband #M.

It may be understood that when subband quantization is considered, precoding matrices #1 corresponding to reference signals #A on different RBs on a same subband are the same. For example, if both the RS #1 and the RS #2 are carried on the subband #1, $B_1$ and $B_2$ respectively corresponding to the RS #1 and the RS #2 are the same.

Optionally, in the K reference signals #A shown in FIG. 4, precoding matrices #1 corresponding to reference signals #A on any two different subbands are different.

It should be understood that in FIG. 4, only an example in which one subband includes two RBs is used for description. In a different system configuration, a quantity of RBs included in one subband may be different.

A form of the precoding matrix #1 is not limited in the embodiments.

For example, the precoding matrix #1 may be a random semi-unitary matrix and is denoted as $\Psi$.

For example, when there are K reference signals #A and the first frequency domain unit is an RB, $B_k$ may be represented as:

$$B_k = \Psi_k, \text{ and } k=1, 2, \ldots, K \quad (1)$$

$\Psi_k$ represents a random semi-unitary matrix whose dimension is $M_t \times P$ and b for different k, $\Psi_k$ needs to be different.

For another example, when there are K reference signals #A and the first frequency domain unit is a subband, if subband quantization is considered, precoding matrices #1 corresponding to reference signals #A on different RBs on a same subband are the same, $B_k$ may be represented as:

$$B_k = \Psi_m, \text{ and } K \in C_m, m=1, 2, \ldots, M \quad (2)$$

M is a quantity of subbands, $\Psi_m$ represents a random semi-unitary matrix whose dimension is $M_t \times P$, for different m, $\Psi_m$ needs to be different, and represents an RB set, $C_1 \cup C_2 \cup \ldots \cup C_M = \{1, 2, \ldots, K\}$ that carries reference signals #A and that is included in an $m^{th}$ subband. As shown in FIG. 4, if an RB set that carries reference signals #A and that is included in the subband #1 is the RB #1 and the RB #2, $C_1 = \{1, 2\}$; if an RB set that carries reference signals #A and that is included in the subband #2 is the RB #3 and the RB #4, $C_2 = \{3, 4\}$; and if an RB set that carries reference signals #A and that is included in the subband #M is the RB #K−1 and the RB #K, $C_M = \{K-1, K\}$.

In another example, the precoding matrix #1 may be a product of a fixed beam matrix and a mutually unbiased bases (MUB) matrix. The fixed beam matrix may be a semi-unitary matrix whose different columns have a same beam directivity pattern. For example, the fixed beam matrix may be a discrete Fourier transform (DFT) matrix, which is denoted as F, and the MUB matrix is denoted as $\Phi$.

For example, when there are K reference signals #A and the first frequency domain unit is an RB, $B_k$ may be represented as:

$$B_k = F\Phi_{mod(k,P+1)}, \text{ and } k=1, 2, \ldots, K \quad (3)$$

$\{\Phi_0, \Phi_1, \ldots, \Phi_P\}$ represents a set of MUB matrices whose P+1 dimensions are all P×P, and mod(a, b) represents a modulo b.

For another example, when there are K reference signals #A and the first frequency domain unit is a subband, $B_k$ may be represented as:

$$B_k = F\Phi_{mod(k,P+1)}, k \in C_m, m=1, 2, \ldots, M \quad (4)$$

$\{\Phi_0, \Phi_1, \ldots, \Phi_P\}$ represents a set of MUB matrices whose P+1 dimensions are all P×P, and mod(a,b) a modulo b.

S240: The terminal device generates a PMI #1.

S250: The terminal device sends the PMI #1. Correspondingly, in S250, the network device receives the PMI #1.

The PMI #1 is determined by the terminal device based on the plurality of received reference signals #A. The PMI #1 indicates a plurality of codewords #1, the plurality of codewords #1 correspond one-to-one to a plurality of second frequency domain units, the plurality of second frequency domain units and the plurality of first frequency domain units belong to a same frequency domain resource, and the plurality of codewords #1 are used for determining a downlink channel. That the plurality of codewords #1 may correspond one-to-one to a plurality of second frequency domain units may be understood as that each codeword #1 is obtained by the terminal device based on the reference signal #A in the second frequency domain unit.

The second frequency domain unit may be a subband, an RB, an RBG, a PRG, or the like. This is not limited in the embodiments.

The frequency domain resource may be an RB, an RBG, a predefined subband, a frequency band, a BWP, or a CC.

That the plurality of second frequency domain units and the plurality of first frequency domain units belong to a same frequency domain resource may be understood as that a frequency domain resource including the plurality of second frequency domain units is the same as a frequency domain resource including the plurality of first frequency domain units. For example, the first frequency domain unit is an RB, and the second frequency domain unit is an RBG. If there are 12 first frequency domain units, the frequency domain resource including the plurality of first frequency domain units is 12 RBs and is denoted as an RB #1 to an RB #12. Correspondingly, the frequency domain resource including the plurality of second frequency domain units is also 12 RBs and is denoted as the RB #1 to the RB #12. For another example, if a bandwidth including the plurality of first frequency domain units is 15 Hz, a bandwidth including the plurality of second frequency domain units is also 15 Hz.

An example in which the second frequency domain unit is an RB is used below for description. In other words, an example in which the terminal device obtains the codeword #1 based on the reference signal #A received on each RB is used below for description.

After receiving the plurality of reference signals #A sent by the network device, the terminal device may measure the downlink channel based on the plurality of reference signals #A and estimate an equivalent channel of each RB. A method for estimating the equivalent channel of each RB by the terminal device is not limited in the embodiments. For example, the terminal device may estimate the equivalent channel of each RB by using a least square (LS) method.

For example, for a $k^{th}$ reference signal #A sent by the network device, a signal received by the terminal device may be represented as:

$$Y_k = H_{dl,k} B_k X_k + Z_k, \text{ and } k=1,2,\ldots,K \tag{5}$$

$H_{dl,k}$ represents a downlink channel on the $k^{th}$ RB, and a dimension is $M_r \times M_t$; and $Z_k$ represents interference noise, and a dimension is $M_r \times P$. According to the formula (5), an LS estimation of an equivalent channel $H_{dl,k} B_k$ of the $k^{th}$ RB may be obtained as $Y_k X_k^{-1}$.

Optionally, when the first frequency domain unit is a subband, based on the foregoing descriptions, precoding matrices #1 respectively corresponding to all reference signals #A in a same subband are the same. Therefore, the terminal device may further perform joint filtering noise reduction processing on LS estimation results of all RBs in the same subband, and the finally obtained equivalent channel on the $k^{th}$ RB may be represented as $\overline{H_{dl,k} B_k}$. A method for the joint filtering noise reduction processing is not limited in the embodiments.

Further, the terminal device may determine a codeword #1 corresponding to each RB based on the equivalent channel of each RB and feeds back the codeword #1 to the network device by using the PMI #1.

A method for determining, by the terminal device, the codeword #1 of each RB based on the equivalent channel of each RB is not limited in the embodiments. For example, the terminal device may perform singular value decomposition (SVD) on the equivalent channel of each RB, to determine the codeword #1 of each RB. In the codeword #1 of the RB, each column may correspond to one transport layer. A codeword #1 of the $k^{th}$ RB is denoted as $j_k$ a dimension of the codeword #1 is P×R, and R is a quantity of layers of the transport layer. It may be understood that when precoding matrices #1 respectively corresponding to reference signals #A on all RBs are different, quantization feedback of a codeword #1 of each RB should be performed independently.

Optionally, the terminal device may further perform quantization feedback based on a subband. In other words, the second frequency domain unit may be a subband. The terminal device may determine an equivalent channel of a subband based on equivalent channels of all RBs in the subband, and further determine a codeword #1 of the subband based on the equivalent channel of the subband. Similarly, in the codeword #1 of the subband, each column may correspond to one transport layer. A codeword #1 of the $m^{th}$ to subband is denoted as $W_m$, a dimension of the codeword #1 is P×R, and R is the quantity of the layers of the transport layer. It may be understood that when precoding matrices #1 respectively corresponding to reference signals #A on all subbands are different, quantization feedback of a codeword #1 of each subband needs to be performed independently.

A manner in which the terminal device feeds back, by using the PMI #1, the codeword #1 of each RB to the network device is not limited in the embodiments.

For example, the terminal device may send a plurality of PMIs #1 to the network device, and each PMI #1 indicates a codeword #1 of one RB. For another example, the terminal device may send a PMI #1 to the network device, and the PMI #1 indicates the codeword #1 of each RB.

A manner in which the terminal device determines the PMI #1 is not limited in the embodiments. For example, the terminal device may determine the PMI based on a port selection codebook. The port selection codebook may be, for example, a type II port selection codebook (type II port selection codebook) defined in an NR protocol. For more manners in which the terminal device determines the PMI #1, refer to the conventional technology. For brevity, details are not described again in the embodiments.

Further, after receiving the PMI #1, the network device may determine the codeword #1 of each RB based on the PMI #1.

S260: The network device determines the downlink channel based on the codeword #1 of each RB and the spatial frequency domain channel characteristic matrix of the uplink channel.

Make $P_k = (e_k^T \otimes I_{M_t}) P$. $e_k$ represents a column vector whose dimension is K×1 only a $k^{th}$ element of the column vector is 1, and the remaining elements are 0, and $I_{M_t}$ represents a unit matrix whose dimension is $M_t \times M_t$.

When the terminal device performs quantization feedback based on the subband, make $J_k = W_m$, k∈$C_m$.

Further, the network device may perform the following iterative operation:

for $nIter = 1:IterNum$ if $nIter == 1$ $$G = \text{t\_largest\_eigvec}\left(\sum_{k=1}^{K}(P_k^T B_k J_k)(P_k^T B_k J_k)^H\right)$$

else $$J_k^H B_k^H P_k^* G = V_{k,1} \Lambda_k V_{k,2}^H$$

$$U_k = \begin{cases} I_r & k=1 \\ V_{k,1} V_{k,2}^H & \text{other} \end{cases}$$

$$G = \left(\sum_{k=1}^{K}(P_k^T B_k)(P_k^T B_k)^H + \sigma^2 I\right)^{-1} \sum_{k=1}^{K} P_k^T B_k J_k U_k^H$$

end end t_largest_eigvec( ) represents obtaining first t maximum eigenvectors, $V_{k,1}$ and $V_{k,2}^H$ respectively represent left and right eigenvectors of $J_k^H B_k^H P_k^* G$, $J_k^H B_k^H P_k^* G = V_{k,1} \Lambda_k V_{k,2}^H$ is obtained by using SVD decomposition, IterNum is a quantity of iterations, and $\sigma^2$ is a positive real parameter. G obtained through iteration represents a reconstructed angle-delay domain channel. Finally, the network device obtains a spatial frequency domain channel on each RB according to a formula (6):

$$\overline{H_{dl,k}} = P_k^* G \; k=1,2,\ldots K \tag{6}$$

It should be understood that in the foregoing process of determining the downlink channel, only an example in which the network device determines the downlink channel of each RB is used for description and should not constitute any limitation on the embodiments. For example, after proper transformation, the foregoing formula of the iterative operation and the formula (6) may be used for determining a downlink channel of each subband.

In the embodiments, different precoding matrices are loaded for the reference signals in the at least two different first frequency domain units in the same time domain unit, so that correlation between channels in different frequency domain units can be reduced, and correlation between errors of quantization feedback performed on codewords #1 in the different frequency domain units by the terminal device can be further reduced. Therefore, precision of reconstructing the downlink channel can be improved. In addition, in the embodiments, the downlink channel is jointly reconstructed in angle-delay domain by using sparsity of the downlink channel in angle-delay domain, and then the angle-delay domain channel is transformed to the spatial frequency domain channel. This can reduce complexity of reconstructing the downlink channel and improve performance of reconstructing the downlink channel.

Optionally, the method 200 may further include S270 to S290.

S270: The network device sends a plurality of reference signals #B. Correspondingly, in S270, the terminal device receives the plurality of reference signals #B.

The plurality of reference signals #B may be reference signals in the plurality of first frequency domain units in the same time domain unit. The time domain unit in which the plurality of reference signals #B are located is denoted as a time domain unit #2 below. The plurality of reference signals #B may be respectively precoded by using precoding matrices #2 corresponding to the first frequency domain units in which the reference signals #B are located, and precoding matrices #2 corresponding to at least two different first frequency domain units are different. In other words, reference signals #B carried in the at least two different first frequency domain units are precoded by using the different precoding matrices #2.

Optionally, precoding matrices #2 corresponding to any two different first frequency domain units are different. In other words, reference signals #A carried in the any two different first frequency domain units are precoded by using the different precoding matrices #1.

For a mapping relationship between the plurality of reference signals #B and a time-frequency resource, refer to the descriptions of the reference signals #A in S230. For brevity, details are not described again in the embodiments.

For descriptions of the precoding matrix #2, refer to the descriptions of the precoding matrix #1 in S230. For brevity, details are not described again in the embodiments.

The time domain unit #2 is different from the time domain unit #1.

A relationship between the precoding matrix #1 and the precoding matrix #2 is described below.

The relationship between the precoding matrix #1 and the precoding matrix #2 is not limited in the embodiments.

In an example, a precoding matrix #1 and a precoding matrix #2 that respectively correspond to a reference signal #A and a reference signal #B in a same frequency domain unit may be the same. An example in which the first frequency domain unit is a subband is used below for description.

Figure 5:
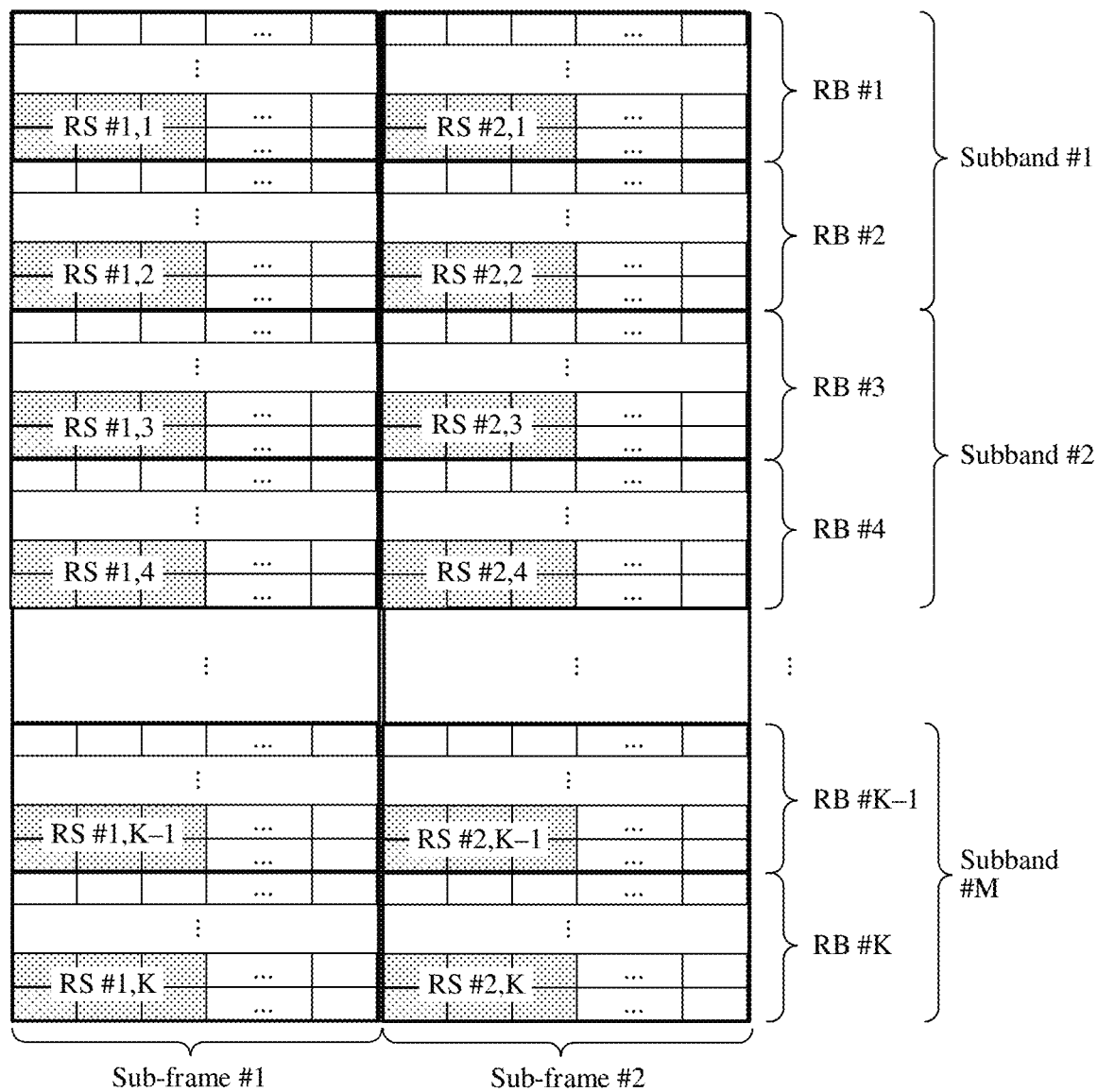
FIG. 5 is a schematic diagram of mapping reference signals to time-frequency resources according to an embodiment.

For example, as shown in FIG. 5, both an RS #1,1 (one example of the reference signals #A) and an RS #2,1 (one example of the reference signals #B) are reference signals on the subband #1. In this case, a precoding matrix #1 and a precoding matrix #2 that respectively correspond to the RS #1,1 and the RS #2,1 may be the same. For another example, both an RS #1,3 (one example of the reference signals #A) and an RS #2,3 (one example of the reference signals #B) are reference signals on the subband #2. In this case, a precoding matrix #1 and a precoding matrix #2 that respectively correspond to the RS #1,3 and the RS #2,3 may be the same.

In another example, the precoding matrix #1 and the precoding matrix #2 that respectively correspond to the reference signal #A and the reference signal #B in the same first frequency domain unit may be different. An example in which the first frequency domain unit is a subband is used below for description.

For example, as shown in FIG. 5, the precoding matrix #1 corresponding to the RS #1,1 is different from the precoding matrix #2 corresponding to the RS #2,1; a precoding matrix #1 corresponding to an RS #1,2 is different from a precoding matrix #2 corresIding to an RS #2,2; . . . ; and a precoding matrix #1 corresponding to an RS #1,K is different from a precoding matrix #2 corresponding to an RS #2,K.

Optionally, a precoding matrix #1 corresponding to any reference signal #A is different from a precoding matrix #2 corresponding to any reference signal #B.

For example, as shown in FIG. 5, the precoding matrix #1 corresponding to the RS #1,1 is different from precoding matrices #2 respectively corresponding to the RS #2,1 to the RS #2,K; the precoding matrix #1 corresponding to the RS #1,2 is different from the precoding matrices #2 respectively corresponding to thIS #2,1 to the RS #2,K; . . . ; and the precoding matrix #1 corresponding to the RS #1,K is different from the precoding matrices #2 respectively corresponding to the RS #2,1 to the RS #2,K.

Optionally, the network device may further send a plurality of reference signals #C in a time domain unit #3 and may send a plurality of reference signals Iin a time domain unit #4, . . . , and the like. The time domain unit #3 is different from the time domain unit #4, and the time domain unit #3 and the time domain unit #4 are different from the time domain unit #2 and the time domain unit #1.

Without loss of generality, the following uses an example in which the network device sends reference signals in L time domain units to describe precoding matrices corresponding to reference signals in different time domain units. It should be understood that reference signals described below still satisfy a condition that precoding matrices respectively corresponding to reference signals in at least two different first frequency domain units are different. The following uses an example in which the time domain unit is a sub-frame and the first frequency domain unit is a subband for description.

It is assumed that there are K reference signals sent by the network device in each sub-frame, and a reference signal sent by the network device on a $l^{th}$ RB in a $k^{th}$ sub-frame is denoted as $B_{k,l}X_{k,l}$, where $B_{k,l}$ and $X_{k,l}$ are respectively a precoding matrix and a reference signal before precoding, k=1, 2, . . . , K, and l=1, 2, . . . , L.

In an implementation, precoding matrices respectively corresponding to any two reference signals carried in different sub-frames of a same subband are the same.

In an example, $B_{k,l}=\Psi m$, and $k \in C_m$, m=1, 2, . . . , M.

In another example, $B_{k,l}=F\Phi_{mod(m,P+1)}k \in C_m$, m=m=1, 2, . . . , M.

It can be understood from the expression of $B_{k,l}$ in the foregoing two examples that different values of $B_{k,l}$ are related only to a subscript k, and are irrelevant to a subscript l. When $C_m$ to which the subscript k belongs remains unchanged, and a value of the subscript l changes from 1 to L, $B_{k,l}$ remains unchanged. $B_{k,l}$ corresponding to a plurality of reference signals carried in different sub-frames of the same subband remain unchanged.

In another implementation, precoding matrices respectively corresponding to at least two reference signals carried in different sub-frames of the different subband are different.

In an example, $B_{k,l}=\Psi_{m,l}$ and $k \in C_m$, m=1,2, . . . , M.

In another example, $B_{k,l}=F\Phi_{mod(m,P+1)}k \in C_m$, m=m=1, 2, . . . , M.

It can be understood from the expression of $B_{k,l}$ in the foregoing two examples that different values of $B_{k,l}$ are related to both a subscript k and a subscript l. when $C_m$ to which the subscript k belongs and/or a value of the subscript l changes, $B_{k,l}$ may change. $B_{k,l}$ corresponding to a plurality of reference signals carried in different sub-frames of different subbands are not completely the same.

S280: The terminal device generates a PMI #2.

S290: The terminal device sends the PMI #2. Correspondingly, in S290, the network device receives the PMI #2.

The PMI #2 is determined by the terminal device based on the plurality of received reference signals #B. The PMI #2 indicates a plurality of codewords #2, the plurality of codewords #2 correspond one-to-one to the plurality of second frequency domain units, the plurality of second frequency domain units and the plurality of first frequency domain units belong to the same frequency domain resource, and the plurality of codewords #2 are used for determining the downlink channel. That the plurality of codewords #2 may correspond one-to-one to the plurality of second frequency domain units may be understood as that each codeword #2 is obtained by the terminal device based on the reference signal #B in the second frequ_or domain unit.

For a method in which the terminal device determines the PMI #2 based on the received reference signals #B, and sends the PMI #2 to the network device, refer to the descriptions of the PMI #1 in S240. For brevity, details are not described again in the embodiments.

When S270 to S290 in the method 200 are performed, it is assumed that the channel is approximately unchanged in the time domain unit #1 and the time domain unit #2, and in S260, the terminal device may determine the downlink channel by combining the PMI #1 and the PMI #2.

As described above, the network device may send the plurality of reference signals #C in the time domain unit #3. Correspondingly, the terminal device may measure the downlink channel based on the plurality of reference signals #C and feeds back the PMI #3 to the network device, where the PMI #3 indicates a codeword #3. The network device may send the plurality of reference signals #D in the time domain unit #4. Correspondingly, the terminal device may measure the downlink channel based on the plurality of reference signals #D and feeds back the PMI #4 to the network device, where the I #4 indicates a codeword #4, . . . , and the like. In this case, it is assumed that the downlink channel is approximately unchanged in the plurality of time domain units. In S250, the terminal device may determine the downlink channel by combining the plurality of PMIs.

Without loss of generality, the following uses an example in which the network device sends reference signals in L time domain units to describe a method for jointly determining the downlink channel provided in the embodiments. The following uses an example in which the time domain unit is a sub-frame, and the first frequency domain unit and the second frequency domain unit are RBs for description. It should be understood that a premise of the method described below is that the downlink channel is assumed to be approximately unchanged in L sub-frames. When the downlink channel changes rapidly, the network device may determine the downlink channel based on the PMI #1 described above.

It is assumed that there are K reference signals sent by the network device in each sub-frame, and a signal received by the terminal device on the $k^{th}$ RB in the $l^{th}$ sub-frame may be represented as:

$$Y_{k,l} = H_{dl,k,l} B_{k,l} X_{k,l} + Z_{k,l} \quad (7)$$

$H_{dl,k,l}$ represents a downlink channel on the $k^{th}$ RB in the $l^{th}$ sub-frame, and a dimension is $M_r \times M_t$; and $Z_{k,l}$ represents interference noise, and a dimension is $M_r \times P$. According to the formula (7), an LS estimation of an equivalent channel $H_{dl,k,l} B_{k,l}$ of the $k^{th}$ RB in the $l^{th}$ sub-frame may be obtained as $Y_{k,l} X_{k,l}^{-1}$.

Optionally, when the first frequency domain unit is a subband, based on the foregoing descriptions, precoding matrices respectively corresponding to all reference signals in a same subband are the same. Therefore, the terminal device may further perform joint filtering noise reduction processing on LS estimation results of all RBs in the same subband, and the finally obtained equivalent channel on the $k^{th}$ RB in the $l^{th}$ sub-frame may be represented as $\overline{H_{dl,k,l} B_{k,l}}$. A method for the joint filtering noise reduction processing is not limited in the embodiments.

Further, the terminal device may determine a codeword of the $k^{th}$ RB in the $l^{th}$ sub-frame based on the equivalent channel on the $k^{th}$ RB in the $l^{th}$ sub-frame and feeds back the codeword to the network device by using the PMI. The codeword of the $k^{th}$ RB in the $l^{th}$ sub-frame is denoted as $J_{k,l}$, a dimension of the codeword is $P \times R$, and R is the quantity of the layers of the transport layer. It may be understood that when precoding matrices respectively corresponding to reference signals on all RBs of the $l^{th}$ sub-frame are different, quantization feedback of a codeword of each RB of the $l^{th}$ sub-frame needs be performed independently.

Optionally, the terminal device may further perform quantization feedback based on a subband. In other words, the second frequency domain unit may be a subband. The terminal device may determine an equivalent channel of the $m^{th}$ subband in the $l^{th}$ sub-frame based on equivalent channels of all RBs in the $m^{th}$ subband in the $l^{th}$ sub-frame, and further determine a codeword of the $m^{th}$ subband in the $l^{th}$ sub-frame based on the equivalent channel of the $m^{th}$ subband in the $l^{th}$ sub-frame. The codeword of the $m^{th}$ subband in the $l^{th}$ sub-frame is denoted as $W_{m,l}$, a dimension of the codeword is $P \times R$, and R is the quantity of the layers of the transport layer. When precoding matrices respectively corresponding to reference signals on all subbands of the $l^{th}$ sub-frame are different, quantization feedback of a codeword of each subband of the $l^{th}$ sub-frame needs to be performed independently.

Further, make $P_k = (e_k^T \otimes I_{M_t}) P$.

When the terminal device performs quantization feedback based on the subband, make $J_{k,l} = W_{m,l}, k \in C_m$.

Further, the network device may perform the following iterative operation:

for $nIter = 1 : IterNum$ if $nIter == 1$ $$G = t\_1 \, \arg\text{est\_eigvec} \left( \sum_{l=1}^{L} \sum_{k=1}^{K} (P_k^T B_{k,l} J_{k,l})(P_k^T B_{k,l} J_{k,l})^H \right)$$

else $$J_{k,l}^H B_{k,l}^H P_k^* G = V_{k,l,1} \Lambda_{k,l} V_{k,l,2}^H$$

-continued $$U_{k,l} = \begin{cases} I_r & k = l = 1 \\ V_{k,l,1} V_{k,l,2}^H & \text{other} \end{cases}$$

$$G = \left( \sum_{l=1}^{L} \sum_{k=1}^{K} (P_k^T B_{k,l})(P_k^T B_{k,l})^H + \sigma^2 I \right)^{-1} \sum_{l=1}^{L} \sum_{k=1}^{K} P_k^T B_{k,l} J_{k,l} U_{k,l}^H$$

end end t_largest_eigvec( ) represents obtaining first r maximum eigenvectors, $V_{k,l,1}$ and $V_{k,l,2}{}^H$ respectively represent left and right eigenvectors of $j_{k,l}{}^H B_{k,l}{}^H P_k * G$ $J_{k,l}{}^H B_{k,l}{}^H P_k * G = V_{k,l,1} \wedge_{k,l} V_{k,l,2}{}^H$ is obtained by using SVD decomposition, IterNum is a quantity of iterations, and $\sigma^2$ is a positive real parameter. G obtained through iteration represents a reconstructed angle-delay domain channel. Finally, the network device obtains a spatial frequency domain channel on each RB according to a formula (6):

$$H_{dl,k} = P_k * G \quad k=1,2,\ldots,K \tag{6}$$

It should be understood that in the foregoing process of determining the downlink channel, only an example in which the network device determines the downlink channel of each RB is used for description and should not constitute any limitation on the embodiments. For example, after proper transformation, the foregoing formula of the iterative operation and the formula (6) may be used for determining the downlink channel of each subband.

Figure 6:
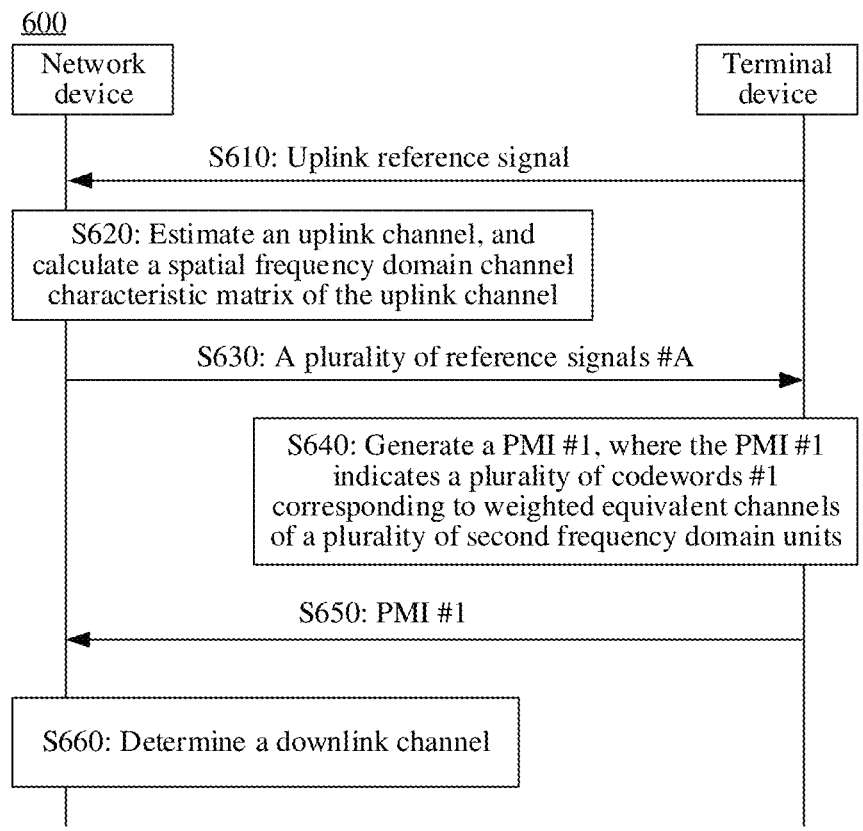
FIG. 6 is a schematic flowchart of a channel measurement method according to another embodiment.

FIG. 6 is a schematic flowchart of a channel measurement method 600 according to another embodiment. As shown in FIG. 6, the method 600 may include S610 to S660. The following describes in detail steps in the method 600.

S610: A terminal device sends an uplink reference signal. Correspondingly, in S610, a network device receives the uplink reference signal.

S620: The network device estimates an uplink channel based on the uplink reference signal and calculates a spatial frequency domain channel characteristic matrix of or uplink channel.

For detailed descriptions of S610 and S620, refer to the foregoing descriptions of S210 and S220. For brevity, details are not described again herein.

S630: The network device sends a plurality of reference signals #A. Correspondingly, in S630, the terminal device receives the plurality of reference signals #A.

The plurality of reference signals #A may be reference signals in different first frequency domain units in a same time domain unit. The time domain unit in which the plurality of reference signals #A are located is denoted as a time domain unit #1 below. The plurality of reference signals #A may be precoded reference signals or may be non-precoded reference signals. This is not limited in the embodiments.

For example, each of the plurality of reference signals #A is a reference signal precoded by using a precoding matrix #1, and different reference signals #A correspond to the same precoding matrix #1. The precoding matrix #1 may be the fixed beam matrix F described above.

As described above, assuming that there are K reference signals #A, a reference signal #A sent by the network device on the $k^{th}$ RB may be denoted as, $B_k X_k$, where $B_k = F$, and $k=1, 2, \ldots, K$.

The time domain unit #1 may be a radio frame, a sub-frame, a slot, or the like. This is not limited in the embodiments. An example in which the time domain unit #1 is a sub-frame is used below for description.

The first frequency domain unit may be a subband, an RB, an RBG, a PRG, or the like. This is not limited in the embodiments.

S640: The terminal device generates a PMI #1.

S650: The terminal device sends the PMI #1. Correspondingly, in S650, the network device receives the PMI #1.

The PMI #1 is determined by the terminal device based on the plurality of received reference signals #A and weighting matrices #1. The PMI #1 indicates a plurality of codewords #1, the plurality of codewords #1 may be used for determining a downlink channel, the plurality of codewords #1 correspond one-to-one to weighted equivalent channels of a plurality of second frequency domain units, a weighted equivalent channel of each second frequency domain unit is obtained based on the weighting matrix #1 corresponding to the second frequency domain unit, and weighting matrices #1 corresponding to at least two different second frequency domain units are different, weighted equivalent channels of the at least two different second frequency domain units are obtained based on the different weighting matrices #1, and the plurality of second frequency domain units and the plurality of first frequency domain units belong to a same frequency domain resource. That the plurality of codewords #1 may correspond one-to-one to weighted equivalent channels of a plurality of second frequency domain units may be understood as that each codeword #1 is obtained by the terminal device based on the reference signal #A in the second frequency domain unit.

The second frequency domain unit may be a subband, an RB, an RBG, a PRG, or the like. This is not limited in the embodiments.

The frequency domain resource may be an RB, an RBG, a predefined subband, a frequency band, a BWP, or a CC.

That the plurality of second frequency domain units and the plurality of first frequency domain units belong to a same frequency domain resource may be understood as that a frequency domain resource including the plurality of second frequency domain units is the same as a frequency domain resource including the plurality of first frequency domain units. For example, the first frequency domain unit is an RB, and the second frequency domain unit is an RBG. If there are 12 first frequency domain units, the frequency domain resource including the plurality of first frequency domain units is 12 RBs and is denoted as an RB #1 to an RB #12. Correspondingly, the frequency domain resource including the plurality of second frequency domain units is also 12 RBs and is denoted as the RB #1 to the RB #12. For another example, if a bandwidth including the plurality of first frequency domain units is 15 Hz, a bandwidth including the plurality of second frequency domain units is also 15 Hz.

An example in which the second frequency domain unit is an RB is used below for description. In other words, an example in which the terminal device obtains the codeword #1 based on the reference signal #A received on each RB is used below for description.

After receiving the plurality of reference signals #A sent by the network device, the terminal device may measure the downlink channel based on the plurality of reference signals #A and estimate an equivalent channel of each RB. A method for estimating the equivalent channel of each RB by the terminal device is not limited in the embodiments. For example, the terminal device may estimate the equivalent channel of each RB by using a least square (LS) method.

For example, if each reference signal #A is a reference signal precoded by using the fixed beam matrix F, for a $k^{th}$ reference signal #A sent by the network device, a signal received by the terminal device may be represented as:

$$Y_k = H_{dl,k} B_k X_k + Z_k, \text{ and } k=1,2,\ldots,K \quad (7)$$

$H_{dl,k}$ (represents a downlink channel on the $k^{th}$ RB, and a dimension is $M_r \times M_t$; and $Z_k$ represents interference noise, and a dimension is $M_r \times P$, and $B_k = F$. According to the formula (7), an LS estimation of an equivalent channel $H_{dl,k} B_k$ of the $k^{th}$ RB may be obtained as $Y_k X_k^{-1}$.

For another example, if each reference signal #A is a non-precoded reference signal, for a $k^{th}$ reference signal #A sent by the network device, a signal received by the terminal device may be represented as:

$$Y_k = H_{dl,k} X_k + Z_k, \text{ and } k=1,2,\ldots,K \quad (8)$$

According to the formula (8), an LS estimation of an equivalent channel $H_{dl,k}$ of the $k^{th}$ RB may be obtained as $Y_k X_k^{-1}$.

Optionally, the precoding matrices #1 respectively corresponding to all reference signals #A are the same. Therefore, the terminal device may further perform joint filtering noise reduction processing on LS estimation results of all RBs in a full band, and the finally obtained equivalent channel on the $k^{th}$ RB may be represented as $\overline{H_{dl,k} B_k}$ or $\overline{H_{dl,k}}$. A method for the joint filtering noise reduction processing is not limited in the embodiments.

Further, the terminal device obtains a weighted equivalent channel of each RB based on the weighting matrix #1 and the equivalent channel of each RB.

The weighting matrix #1 is not limited in the embodiments.

In an example, if the reference signal #A is a reference signal precoded by using the fixed beam matrix F, the weighting matrix #1 may be an MUB matrix.

For example, a weighting matrix #1 used for obtaining a weighted equivalent channel of the $k^{th}$ RB may be denoted as $\Phi_{mod(k,P+1)}$, where $k=1, 2, \ldots, K$, and $\{\Phi_0, \Phi_1, \ldots, \Phi_P\}$ represents a set of MUB matrices whose P+1 dimensions are all P×P, and mod(a, b) represents a modulo b. In this case, the weighted equivalent channel of the $k^{th}$ RB may be represented as $\overline{H_{dl,k} B_k} \Phi_{mod(k,P+1)}$, where $B_k = F$.

Further, the terminal device may determine, based on the weighted equivalent channel of the $k^{th}$ a codeword #1 corresponding to the $k^{th}$ RB. The codeword #1 is denoted as $j_k^l$, a dimension of the codeword #1 is P×R, and R is a quantity of layers of a transport layer.

It may be understood that in this example, weighted equivalent channels of different RBs are obtained based on different weighting matrices #1. Therefore, codebook quantization of each RB needs to be performed independently.

Optionally, the second frequency domain unit may be a subband. In this case, weighted equivalent channels of different subbands may be obtained based on the different weighting matrices #1. A weighting matrix #1 corresponding to an $m^{th}$ subband may be represented as $\Phi_{mod(m,P+1)}$, where $m=1, 2, \ldots, M$, and M is a quantity of subbands.

For example, the terminal device may determine an equivalent channel of the $m^{th}$ subband based on an equivalent channel of each RB in the $m^{th}$ subband, and the equivalent channel may be represented as $\overline{H_{dl,m} B_m}$. Further, a weighted equivalent channel of the $m^{th}$ subband is obtained based on the weighting matrix #1 corresponding to the $m^{th}$ subband and is represented as $\overline{H_{dl,m} B_m} \Phi_{mod(m,P+1)}$.

For another example, the terminal device may first obtain a weighted equivalent channel of each RB in the $m^{th}$ subband based on the weighting matrix #1 corresponding to the $m^{th}$ subband, and then obtain the weighted equivalent channel of the $m^{th}$ subband based on the weighted equivalent channel of each RB in the $m^{th}$ subband.

Further, the terminal device may obtain a codeword #1 of the $m^{th}$ subband based on the weighted equivalent channel of the $m^{th}$ subband. The codeword #1 is denoted as $W_m$, a dimension of the codeword #1 is P×R, and R is the quantity of the layers of the transport layer.

A method for determining, by the terminal device, a codeword #1 of each RB based on the weighted equivalent channel of each RB is not limited in the embodiments. For example, the terminal device may perform singular value decomposition (SVD) on the weighted equivalent channel of each RB, to determine the codeword #1 corresponding to the weighted equivalent channel of each RB.

A manner in which the terminal device feeds back, by using the PMI #1, the codeword #1 of each RB to the network device is not limited in the embodiments.

For example, the terminal device may send a plurality of PMIs #1 to the network device, and each PMI #1 indicates a codeword #1 of one RB. For another example, the terminal device may send a PMI #1 to the network device, and the PMI #1 indicates the codeword #1 of each RB.

A manner in which the terminal device determines the PMI #1 is not limited in the embodiments. For example, the terminal device may determine the PMI based on a port selection codebook. The port selection codebook may be, for example, a type II port selection codebook (type II port selection codebook) defined in an NR protocol. For more manners in which the terminal device determines the PMI #1, refer to the conventional technology. For brevity, details are not described again in the embodiments.

Further, after receiving the PMI #1, the network device may determine the codeword #1 of each RB based on the PMI #1.

S660: The network device determines the downlink channel based on the codeword #1 of each RB and the spatial frequency domain channel characteristic matrix of the uplink channel.

Make $P_k = (e_k^T \otimes I_{M_t})P$. $e_k$ represents a column vector whose dimension is K×1, only a $k^{th}$ element of the column vector is 1, and the remaining elements are 0, and $I_{M_t}$ represents a unit matrix whose dimension is $M_t \times M_t$.

If the codeword #1 fed back by the terminal device is J k, and the weighting matrix #1 is the MUB matrix, make $J_k = \Phi_{mod(k,P+1)} J_k^1$.

If the codeword #1 fed back by the terminal device is $W_m$, and the weighting matrix #1 is the MUB matrix, make $J_k = \Phi_{mod(k,P+1)} W_m$, where $k \in C_m$.

Further, the network device may perform the following iterative operation:

for nIter = 1:IterNum if nIter == 1

$$G = t\_1 \text{ arg est\_eigvec}\left(\sum_{k=1}^{K} (P_k^T B_k J_k)(P_k^T B_k J_k)^H\right)$$

else $$J_k^H B_k^H P_k^* G = V_{k,1} \Lambda_k V_{k,2}^H$$

$$U_k = \begin{cases} I_r & k=1 \\ V_{k,1} V_{k,2}^H & \text{other} \end{cases}$$

-continued $$G = \left(\sum_{k=1}^{K}(P_k^T B_k)(P_k^T B_k)^H + \sigma^2 I\right)^{-1} \sum_{k=1}^{K} P_k^T B_k J_k U_k^H$$

end end t_largest_eigvec( ) represents obtaining first t maximum eigenvectors, $V_{k,1}$ and $V_{k,2}^H$ respectively represent left and right eigenvectors of $J_k^H B_k^H P_k^* G$, $J_k^H B_k^H P_k^* G = V_{k,1} \bigwedge_k V_{k,2}^H$ is obtained by using SVD decomposition, IterNum is a quantity of iterations, and $\sigma^2$ is a positive real parameter. G obtained through iteration represents a reconstructed angle-delay domain channel. Finally, the network device obtains a spatial frequency domain channel on each RB according to a formula (6):

$$\overline{H_{dl,k}} = P_k * G \quad k=1,2,\ldots,K \quad (6)$$

It should be understood that in the foregoing process of determining the downlink channel, only an example in which the network device determines the downlink channel of each RB is used for description and should not constitute any limitation on the embodiments. For example, after proper transformation, the foregoing formula of the iterative operation and the formula (6) may be used for determining a downlink channel of each subband.

In the embodiments, the different weighting matrices #1 are loaded for equivalent channels in the at least two different second frequency domain units, so that correlation between channels in the different second frequency domain units can be reduced, and correlation between errors of quantization feedback performed on codewords #1 in the different second frequency domain units by the terminal device can be further reduced. Therefore, precision of reconstructing the downlink channel can be improved. In addition, in the embodiments, the downlink channel is jointly reconstructed in angle-delay domain by using sparsity of the downlink channel in angle-delay domain, and then the angle-delay domain channel is transformed to the spatial frequency domain channel. This can reduce complexity of reconstructing the downlink channel and improve performance of reconstructing the downlink channel.

Optionally, the method 600 may further include S670 to S690.

S670: The network device sends a plurality of reference signals #B. Correspondingly, in S670, the terminal device receives the plurality of reference signals #B.

The plurality of reference signals #B may be reference signals in the different first frequency domain units in the same time domain unit. The time domain unit in which the plurality of reference signals #B are located is denoted as a time domain unit #2 below. The plurality of reference signals #B may be precoded reference signals or may be non-precoded reference signals. This is not limited in the embodiments.

For example, each of the plurality of reference signals #B is a reference signal precoded by using a precoding matrix #2, and precoding matrices #2 corresponding to different reference signals #B are the same. The precoding matrix #2 may be the fixed beam matrix F described above.

As described above, assuming that there are K reference signals #B, a reference signal #B sent by the network device on the $k^{th}$ RB may be denoted as $B_k X_k$, where $B_k = F$, and k=1, 2, ..., K.

The time domain unit #2 is different from the time domain unit #1.

S680: The terminal device generates a PMI #2.

S690: The terminal device sends the PMI #2. Correspondingly, in S690, the network device receives the PMI #2.

The PMI #2 is determined by the terminal device based on the plurality of received reference signals #B and weighting matrices #2. The PMI #2 indicates a plurality of codewords #2, the plurality of codewords #2 are used for determining a downlink channel, the plurality of codewords #2 correspond one-to-one to the weighted equivalent channels of the plurality of second frequency domain units, a weighted equivalent channel of each second frequency domain unit is obtained based on the weighting matrix #2 corresponding to the second frequency domain unit, and weighting matrices #2 corresponding to the at least two different second frequency domain units are different, weighted equivalent channels of the at least two different second frequency domain units are obtained based on the different weighting matrices #2, the plurality of second frequency domain units and the plurality of first frequency domain units belong to a same frequency domain resource. That the plurality of codewords #2 may correspond one-to-one to the weighted equivalent channels of the plurality of second frequency domain units may be understood as that each codeword #2 is obtained by the terminal device based on the reference signal #B in the second frequency domain unit.

The second frequency domain unit may be a subband, an RB, an RBG, a PRG, or the like. This is not limited in the embodiments.

For descriptions of the weighting matrix #2, refer to the descriptions of the weighting matrix #1 in S650. For a method for generating and sending the PMI #2 by the terminal device based on the received reference signal #B, refer to the descriptions of the PMI #1 in S650. For brevity, details are not described again in the embodiments.

A relationship between the weighting matrix #1 and the weighting matrix #2 is described below. It should be noted that, the weighting matrix #1 that corresponds to the second frequency domain unit and that is mentioned below represents a weighting matrix used by the terminal device to determine the weighted equivalent channel of the second frequency domain unit, and the terminal device determines the weighted equivalent channel based on the reference signal #A and the weighting matrix #1 that are received on the second frequency domain unit. The weighting matrix #2 that corresponds to the second frequency domain unit and that is mentioned below represents the weighting matrix used by the terminal device to determine the weighted equivalent channel of the second frequency domain unit, and the terminal device determines the weighted equivalent channel based on the reference signal #A and the weighting matrix #1 that are received on the second frequency domain unit.

The relationship between the weighting matrix #1 and the weighting matrix #2 is not limited in the embodiments.

In an example, a weighting matrix #1 and a weighting matrix #2 that correspond to a same second frequency domain unit in different time domain units may be the same. An example in which the second frequency domain unit is an RB is used below for description.

For example, as shown in FIG. 5, the terminal device may obtain an equivalent weighted channel of the RB #1 based on an RS #1,1 (one example of the reference signals #A) on the RB #1 and the weighting matrix #1, or the terminal device may obtain the equivalent weighted channel of the RB #1 based on an RS #2,1 (one example of the reference signals #B) on the RB #1 and the weighting matrix #2. A weighting matrix #1 and a weighting matrix #2 that correspond to the RB #1 may be the same.

In another example, the weighting matrix #1 and the weighting matrix #2 that correspond to the same second frequency domain unit in the different time domain units are different. An example in which the second frequency domain unit is an RB is used below for description.

For example, as shown in FIG. 5, the terminal device may obtain the equivalent weighted channel of the RB #1 based on the RS #1,1 (one example of the reference signals #A) on the RB #1 and the weighting matrix #1, or the terminal device may obtain the equivalent weighted channel of the RB #1 based on the RS #2,1 (one example of the reference signals #B) on the RB #1 and the weighting matrix #2. The weighting matrix #1 and the weighting matrix #2 that correspond to the RB #1 may be different.

Optionally, a weighting matrix #1 corresponding to any second frequency domain unit and a weighting matrix #2 corresponding to any other second frequency domain unit are different.

For example, as shown in FIG. 5, the weighting matrix #1 corresponding to the RB #1 is different from weighting matrices #2 respectively corresponding to the RB #1 to the RB #K; the weighting matrix #1 corresponding to the RB #2 is different from the weighting matrices #2 respectively corresIding to the RB #1 to the RB #K; . . . ; and the weighting matrix #1 corresponding to the RB #K is different from the weighting matrices #2 respectively corresponding to the RB #1 to the RB #K.

When S670 to S690 in the method 600 are performed, it is assumed that the channel is approximately unchanged in the time domain unit #1 and the time domain unit #2, and in S660, the terminal device may determine the downlink channel by combining the PMI #1 and the PMI #2.

Optionally, the network device may further send a plurality of reference signals #C in a time domain unit #3 and may send a plurality of referenceIgnals #D in a time domain unit #4, . . . , and the like. The time domain unit #3 is different from the time domain unit #4, and the time domain unit #3 and the time domain unit #4 are different from the time domain unit #2 and the time domain unit #1.

Without loss of generality, the following uses an example in which the network device sends reference signals in L time domain units to describe weighting matrices corresponding to second frequency domain units in different time domain units. It should be understood that content described below still satisfies a condition that weighting matrices corresponding to at least two different second frequency domain units in a same time domain unit are different. An example in which the second frequency domain unit is an RB is used below for description.

It is assumed that there are K reference signals sent by the network device in each sub-frame. If the reference signals sent by the network device are not precoded, referring to the foregoing formula (8), an equivalent channel$^{th}$ at is of the k$^{th}$ RB in the l$^{th}$ sub-frame and that is obtained by the terminal device may be denoted as $H_{dl,k,l}=Y_{k,l}X_{k,l}^{-1}$. If the reference signals sent by the network device are precoded by using the fixed beam matrix F referring to the foregoing formula (7), the equivalent channel$^{th}$ at is of the k$^{th}$ RB in the l$^{th}$ sub-frame and that is obtained by the terminal device may be denoted as $H_{dl,k,l}B_{k,l}=Y_{k,l}X_{k,l}^{-1}$, where $B_{k,l}=F$.

In an implementation, the weighting matrices corresponding to the same second frequency domain unit in the different time domain units are the same.

In an example, a weighting matrix corresponding to the k$^{th}$ RB in the l$^{th}$ sub-frame may be represented as $\Phi_{mod(k,P+1)}$.

It can be understood from the expression of the weighting matrix in the foregoing example that different values of the weighting matrix are related only to the subscript k, and are irrelevant to the subscript l. When the k remains unchanged, and a value of the subscript l changes from 1 to L, the weighting mIx remains unchanged. The weighting matrices corresponding to the same second frequency domain unit in the different time domain units remain unchanged.

In another implementation, the weighting matrix #1 and the weighting matrix #2 that correspond to the same second frequency domain unit in the different time domain units are different.

In an example, a weighting matrix corresponding to the k$^{th}$ RB in the l$^{th}$ sub-frame may be represented as $\Phi_{mod(k+l,P+1)}$.

It can be understood from the expression of the weighting matrix in the foregoing example that the different values of the weighting matrix are related to both the subscript k and the subscript l. When the subscript k changes and/or a value of the subscript l changes, the Ihting matrix may change. The weighting matrices corresponding to the same second frequency domain unit in the different time domain units are not completely the same.

Correspondingly, the terminal device may generate a PMI #3 based on the plurality of reference signals #C, generate a PMI #4Ised on the plurality of reference signals #D, . . . , and the like. Further, it is assumed that the downlink channel is approximately unchanged in the plurality of time domain units. In S660, the terminal device may determine the downlink channel by combining the plurality of PMIs.

Without loss of generality, the following uses an example in which the network device sends reference signals in L time domain units to describe a method for jointly determining the downlink channel provided in the embodiments. The following uses an example in which the time domain unit is a sub-frame, and the first frequency domain unit and the second frequency domain unit are RBs for description and uses an example in which the reference signal sent by the network device is a reference signal precoded by using the fixed beam matrix for description. It should be understood that a premise of the method described below is that the downlink channel is assumed to be approximately unchanged in L sub-frames. When the downlink channel changes rapidly, the network device may determine the downlink channel based on the PMI #1 described above.

It is assumed that there are K reference signals sent by the network device in each sub-frame, and a signal received by the terminal device on the k$^{th}$ RB in the l$^{th}$ sub-frame may be represented as:

$$Y_{k,l}=H_{dl,k,l}B_{k,l}X_{k,l}+Z_{k,l} \qquad (9)$$

$H_{dl,k,l}$ represents a downlink channel on the k$^{th}$ RB in the l$^{th}$ sub-frame, and a dimension is $M_r \times M_t$; and $Z_{k,l}$ represents interference noise, and a dimension is $M_r \times P$, where $B_{k,l}=F$ k=1, 2, . . . , K and l=1, 2, . . . , L. According to the formula (9), an LS estimation of an equivalent channel $H_{dl,k,l}B_{k,l}$ of the k$^{th}$ RB in the l$^{th}$ sub-frame may be obtained as $Y_{k,l}X_{k,l}^{-1}$.

Optionally, precoding matrices respectively corresponding to all reference signals are the same. Therefore, the terminal device may further perform joint filtering noise reduction processing on the LS estimation results of all RBs in the full band, and the finally obtained equivalent channel on the $k^{th}$ RB may be represented as $\overline{H_{dl,k,l}B_{k,l}}$. A method for the joint filtering noise reduction processing is not limited in the embodiments.

Further, that the weighting matrix is the MUB matrix is used as an example, and the terminal device may obtain an equivalent weighted channel of the $k^{th}$ RB in the $l^{th}$ sub-frame: $\overline{H_{dl,k,l}B_{k,l}}\Phi_{mod(m+l,P+1)}$.

Further, the terminal device may determine a codeword of the $k^{th}$ RB in the $l^{th}$ sub-frame based on the weighted equivalent channel on the $k^{th}$ RB in the $l^{th}$ sub-frame and feeds back the codeword to the network device by using the PMI. The codeword of the $k^{th}$ RB in the $l^{th}$ sub-frame is denoted as $j_{k,l}^1$, a dimension of the codeword is P×R, and R is the quantity of the layers of the transport layer. It may be understood that when weighting matrices respectively corresponding to all RBs of the $l^{th}$ sub-frame are different, quantization feedback of a codeword of each RB of the $l^{th}$ sub-frame needs to be performed independently.

Optionally, the terminal device may further perform quantization feedback based on a subband. In other words, the second frequency domain unit may be a subband. The terminal device may determine an equivalent channel of the $m^{th}$ subband in the $l^{th}$ sub-frame based on equivalent channels of all RBs in the $m^{th}$ subband in the $l^{th}$ sub-frame; further, determine a weighted equivalent channel of the $m^{th}$ subband in the $l^{th}$ sub-frame based on the equivalent channel of the $m^{th}$ subband in the $l^{th}$ sub-frame; and further, determine a codeword of the $m^{th}$ subband in the $l^{th}$ sub-frame based on the weighted equivalent channel of the $m^{th}$ subband in the $l^{th}$ sub-frame. The codeword of the $m^{th}$ subband in the $l^{th}$ sub-frame is denoted as $W_{m,l}$, a dimension of the codeword is P×R, and R is the quantity of the layers of the transport layer. When weighting matrices respectively corresponding to all subbands of the $l^{th}$ sub-frame are different, quantization feedback of a codeword of each subband of the $l^{th}$ sub-frame needs to be performed independently.

Further, make $P_k = (e_k^T \otimes I_{M_l})P$, and make $J_{k,l} = \Phi_{mod(k+l,\ P+1)} J_{k,l}^1$.

Alternatively, when the terminal device performs quantization feedback based on the subband, make $J_{k,l} = \Phi_{mod(m+l,P+1)} W_{m,l}$ $k \in C_m$.

Further, the network device may perform the following iterative operation:

for $nIter = 1:IterNum$ if $nIter == 1$ $$G = t\_l\ arg\_est\_eigvec\left(\sum_{l=1}^{L}\sum_{k=1}^{K}(P_k^T B_{k,l} J_{k,l})(P_k^T B_{k,l} J_{k,l})^H\right)$$

else $$J_{k,l}^H B_{k,l}^H P_k^* G = V_{k,l,1}\Lambda_{k,l}V_{k,l,2}^H$$

$$U_{k,l} = \begin{cases} I_r & k = l = 1 \\ V_{k,l,1}V_{k,l,2}^H & \text{other} \end{cases}$$

$$G = \left(\sum_{l=1}^{L}\sum_{k=1}^{K}(P_k^T B_{k,l})(P_k^T B_{k,l})^H + \sigma^2 I\right)^{-1}\sum_{l=1}^{L}\sum_{k=1}^{K}P_k^T B_{k,l}J_{k,l}U_{k,l}^H$$

end end t_largest_eigvec( ) represents obtaining first r maximum eigenvectors, $V_{k,l,1}$ and $V_{k,l,2}^H$ respectively represent left and right eigenvectors of $J_{k,l}^H B_{k,l}^H P_k^* G$, $J_{k,l}^H B_{k,l}^H P_k^* G = V_{k,l,1} \Lambda_{k,l} V_{k,l,2}^H$ is obtained by using SVD decomposition, IterNum is a quantity of iterations, and $\sigma^2$ is a positive real parameter. G obtained through iteration represents a reconstructed angle-delay domain channel. Finally, the network device obtains a spatial frequency domain channel on each RB according to a formula (6):

$$\overline{H_{dl,k}} = P_k^* G \quad k = 1, 2, \ldots, K \tag{6}$$

It should be understood that in the foregoing process of determining the downlink channel, only an example in which the network device determines the downlink channel of each RB is used for description and should not constitute any limitation on the embodiments. For example, after proper transformation, the foregoing formula of the iterative operation and the formula (6) may be used for determining the downlink channel of each subband.

It should be further understood that sequence numbers of the processes do not mean execution sequences in the foregoing embodiments. The execution sequences of the processes should be determined based on functions and internal logic of the processes, and this shall not constitute any limitation on the implementation processes of the embodiments.

The foregoing describes in detail$^{th}$ e channel measurement methods provided in the embodiments with reference to FIG. 2 to FIG. 6. The following describes in detail communication apparatuses provided in the embodiments with reference to FIG. 7 to FIG. 9.

Figure 7:
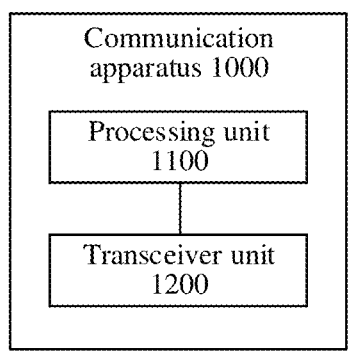
FIG. 7 is a schematic block diagram of a communication apparatus according to an embodiment.

FIG. 7 is a schematic block diagram of a communication apparatus according to an embodiment. As shown in the figure, the communication apparatus 1000 may include a transceiver unit 120Id a processing unit 1100.

The communication apparatus 1000 may correspond to the terminal device in the foregoing method embodiments, for example, may be a terminal device, or may be a component (for example, a circuit, a chip, or a chipItem) disposed in the terminal device.

The communication apparatus 1000 may correspond to the terminal device in the method 200 or the method 600 in the embodiments. The communication apparatus 1000 may include units configured to perform the method performed by the terminal device in the method 200 in FIG. 2 or the method 600 in FIG. 6. In addition, the units in the communication apparatus 1000 and the foregoing other operations and/or functions are separately intended to implement corresponding procedures of the method 200 in FIG. 2 or the method 600 in FIG. 6.

When the communication apparatus 1000 is configured to perform the method 200 in FIG. 2, the transceiver unit 1200 may be configured to perform S210, S230, and S250 in the method 200, and the processing unit 1100 may be configured to perform S240 in the method 200.

When the communication apparatus 1000 is configured to perform the method 600 in FIG. 6, the transceiver unit 1200 may be configured to perform S610, S630, and S650 in the method 600, and the processing unit 1100 may be configured to perform S640 in the method 600.

It should be understood that a process in which the units perform the foregoing corresponding steps is described in detail in the foregoing method embodiments, and for brevity, details are not described herein again.

Figure 8:
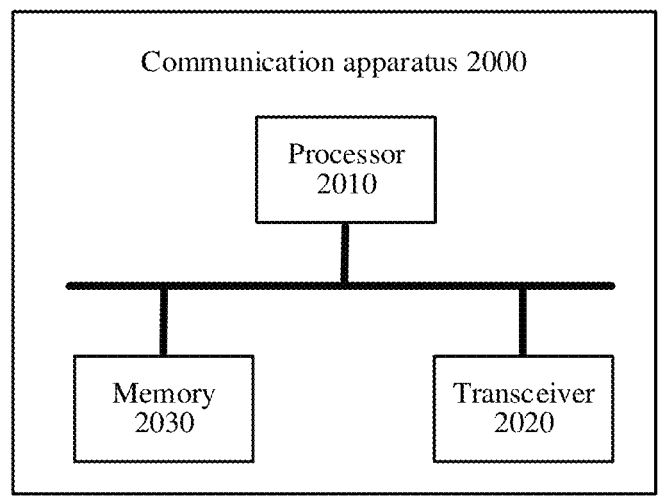
FIG. 8 is another schematic block diagram of a communication apparatus according to an embodiment.
Figure 9:
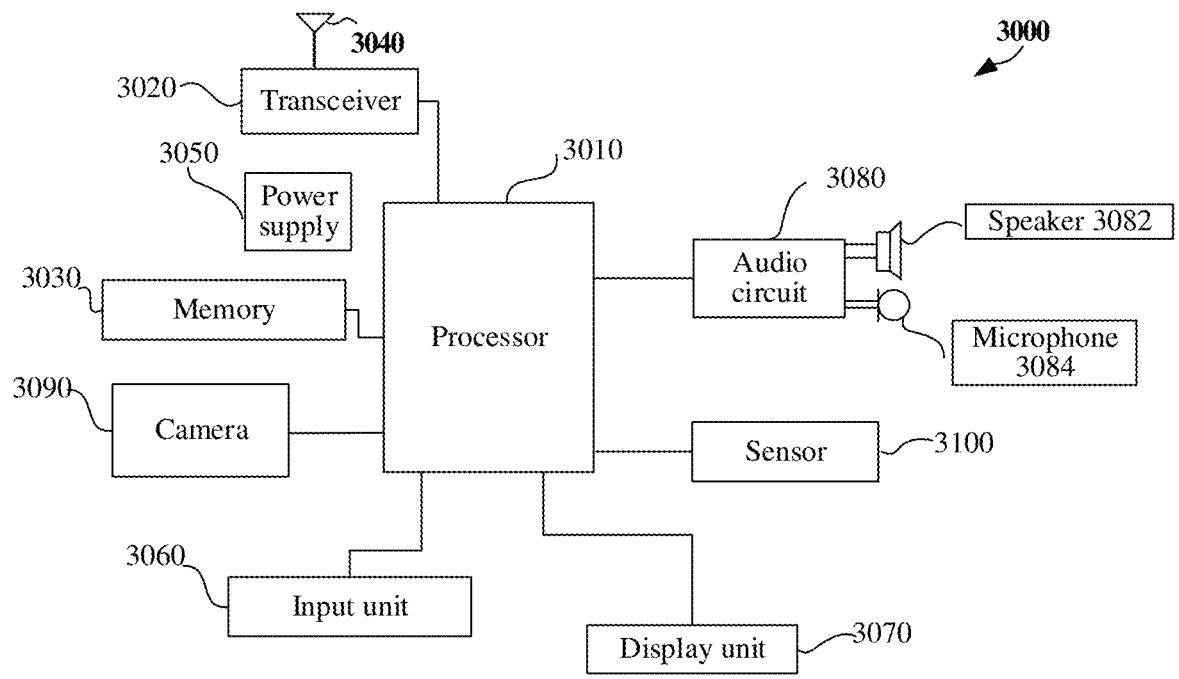
FIG. 9 is a schematic structural diagram of a terminal device according to an embodiment.

It should be further understood that when the communication apparatus 1000 is the terminal device, the transceiver unit 1200 in the communication apparatus 1000 may be implemented by a transceiver, for example, may correspond to a transceiver 2020 in a communication apparatus 2000 shown in FIG. 8 or a transceiver 3020 in a terminal device 3000 shown in FIG. 9, and the processing unit 1100 in the communication apparatus 1000 may be implemented by at least one processor, for example, may correspond to a processor 2010 in the communication apparatus 2000 shown in FIG. 8 or a processor 3010 in the terminal device 3000 shown in FIG. 9.

It should be further understood that when the communication apparatus 1000 is the chip or the chip system disposed in the terminal device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated on Ichip or in the chip system.

The communication apparatus 1000 may correspond to the network device in the foregoing method embodiments, for example, may be a network device, or may be a component (for example, a circuit, a chip, I chip system) disposed in the network device.

The communication apparatus 1000 may correspond to the network device in the method 200 or the method 600 in the embodiments. The communication apparatus 1000 may include units configured to perform the method performed by the network device in the method 200 in FIG. 2 or the method 600 in FIG. 6. In addition, the units in the communication apparatus 1000 and the foregoing other operations and/or functions are separately intended to implement corresponding procedures of the method 200 in FIG. 2 or the method 600 in FIG. 6.

When the communication apparatus 1000 is configured to perform the method 200 in FIG. 2, the transceiver unit 1200 may be configured to perform S210, S230, and S250 in the method 200, and the processing unit 1100 may be configured to perform S220 and S260 in the method 200.

When the communication apparatus 1000 is configured to perform the method 600 in FIG. 6, the transceiver unit 1200 may be configured to perform S610, S630, and S650 in the method 600, and the processing unit 1100 may be configured to perform S620 and S660 in the method 600.

Figure 10:
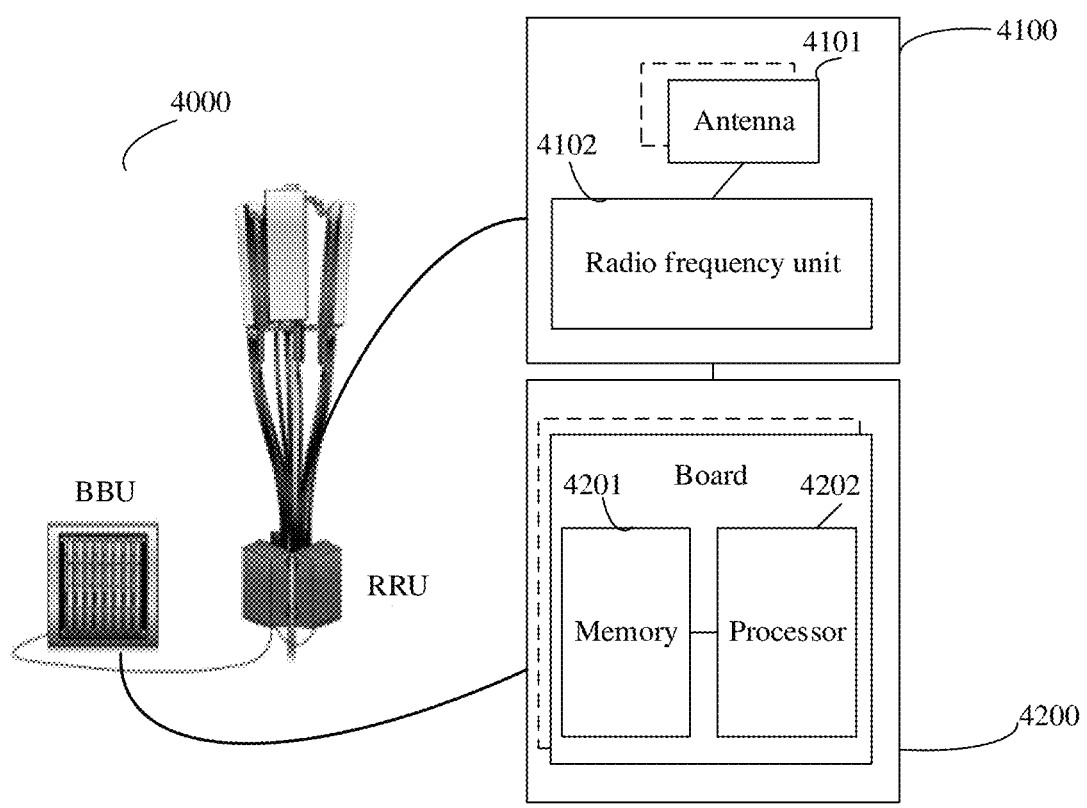
FIG. 10 is a schematic structural diagram of a network device according to an embodiment.

It should be further understood that when the communication apparatus 1000 is the network device, the transceiver unit 1200 in the communication apparatus 1000 may be implemented by a transceiver, for example, may correspond to the transceiver 2020 in the communication apparatus 2000 shown in FIG. 8 or an RRU 4100 in a base station 4000 shown in FIG. 10, and the processing unit 1100 in the communication apparatus 1000 may be implemented by at least one processor, for example, may correspond to the processor 2010 in the communication apparatus 2000 shown in FIG. 8 or a processing unit 4200 or a processor 4202 in the base station 4000 shown in FIG. 10.

It should be further understood that when the communication apparatus 1000 is the chip or the chip system disposed in the network device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated on the chip or in the chip system.

FIG. 8 is another schematic block diagram of the communication apparatus 2000 according to an embodiment. As shown in FIG. 8, the communication apparatus 2000 includes the processor 2010, the transceiver 2020, and a memory 2030. The processor 2010, the transceiver 2020, and the memory 2030 communicate with each other by using an internal connection path. The memory 2030 is configured to store instructions, and the processor 2010 is configured to execute the instructions stored in the memory 2030, to control$^{th}$ e transceiver 2020 to send a signal and/or receive a signal.

It should be understood that the communication apparatus 2000 may correspond to the terminal device in the foregoing method embodiments and may be configured to perform steps and/or procedures performed by the network device or the terminal device in the foregoing method embodiments. Optionally, the memory 2030 may include a read-only memory and a random access memory and may provide instructions and data for the processor. A part of the memory may further include a non-volatile random access memory. The memory 2030 may be an independent device or may be integrated in the processor 2010. The processor 2010 may be configured to execute the instructions stored in the memory 2030. In addition, when the processor 2010 executes the instructions stored in the memory, the processor 2010 is configured to perform steps and/or procedures corresponding to the network device or the terminal device in the foregoing method embodiments.

Optionally, the communication apparatus 2000 is the terminal device in the foregoing embodiments.

Optionally, the communication apparatus 2000 is the network device in the foregoing embodiments.

The transceiver 2020 may include a transmitter and a receiver. The transceiver 2020 may further include an antenna, and there may be one or more antennas. The processor 2010, the memory 2030, and the transceiver 2020 may be devices integrated on different chips. For example, the processor 2010 and the memory 2030 may be integrated on a baseband chip, and the transceiver 2020 may be integrated on a radio frequency chip. Alternatively, the processor 2010, the memory 2030, and the transceiver 2020 may be devices integrated on a same chip. This is not limited.

Optionally, the communication apparatus 2000 is a component disposed in the terminal device, for example, a circuit, a chip, or a chip system.

Optionally, the communication apparatus 2000 is a component disposed in the network device, for example, a circuit, a chip, or a chip system.

Alternatively, the transceiver 2020 may be a communication interface, for example, an input/output interface or a circuit. The transceiver 2020, the processor 2010, and the memory 2030 may be integrated on a same chip, for example, integrated on a baseband chip.

FIG. 9 is a schematic structural diagram of the terminal device 3000 according to an embodiment. The terminal device 3000 may be used in the system shown in FIG. 1 and performs functions of the terminal device in the foregoing method embodiments. As shown in the figure, the terminal device 3000 includes the processor 3010 and the transceiver 3020. Optionally, the terminal device 3000 further includes a memory 3030. The processor 3010, the transceiver 3020, and the memory 3030 may communicate with each other by using an internal connection path, to transfer a control signal and/or a data signal. The memory 3030 is configured to store a computer program, and the processor 3010 is configured to invoke the computer program from the memory 3030 and run the computer program, to control$^{th}$ e transceiver 3020 to send and receive a signal. Optionally, the terminal device 3000 may further include an antenna 3040. The antenna 3040 is configured to send, by using a radio signal, uplink data or uplink control signaling output by the transceiver 3020.

The processor 3010 and the memory 3030 may be integrated into one processing apparatus. The processor 3010 is configured to execute program code stored in the memory 3030 to implement the foregoing functions. During implementation, the memory 3030 may alternatively be integrated in the processor 3010 or may be independent of the processor 3010. The processor 3010 may correspond to the processing unit 1100 in FIG. 7 or the processor 2010 in FIG. 8.

The transceiver 3020 may correspond to the transceiver unit 1200 in FIG. 7 or the transceiver 2020 in FIG. 8. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that the terminal device 3000 shown in FIG. 9 can implement processes related to the terminal device in the method embodiment shown in FIG. 2 or FIG. 6. Operations and/or functions of the modules in the terminal device 3000 are separately intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments. The transceiver 3020 may be configured to perform a sending action by the terminal device for the network device or a receiving operation from the network device described in the foregoing method embodiments. For details, refer to the descriptions in the foregoing method embodiments. Details are not described herein again.

Optionally, the terminal device 3000 may further include a power supply 3050. The power supply 3050 is configured to supply power to various devices or circuits in the terminal device.

In addition, to improve the functions of the terminal device, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

FIG. 10 is a schematic structural diagram of a network device according to an embodiment, for example, may be a schematic structural diagram of a base station. The base station 4000 may be used in the system shown in FIG. 1 and performs functions of the network device in the foregoing method embodiments. As shown in the figure, the base station 4000 may include one or more radio frequency units such as remote radio units (RRUs) 4100 and one or more baseband units (BBUs) (which may also be referred to as distributed units (Dus)) 4200. The RRU 4100 may be referred to as a transceiver unit and may correspond to the transceiver unit 1200 in FIG. 7 or the transceiver 2020 in FIG. 8. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 may be configured to: receive and send a radio frequency signal and perform conversion between the radiI frequency signal anI a baseband signal. For example, the RRU 4100 is configured to send indication information to a terminal device. The BBU 4200 may be configured to: perform baseband processing, control$^{th}$ e base station, and the like. The RRU 4100 and the BBU 4200 may be physically disposed together, or may be physically disposed separately, namely, a distributed base station.

The BBU 4200 is a control center of the base station, may also be referred to as a processing unit, may correspond to the processing unit 1100 in FIG. 7 or the processor 2010 in FIG. 8, and may be configured to complete baseband processing functions such as channel coding, multiplexing, modulation, and spectrum spreading. For example, the BBU (the processing unit) may be configured to control$^{th}$ e base station to perform an operation procedure related to the network device in the foregoing method embodiments, for example, to generate the foregoing indication information.

In an example, the BBU 4200 may include one or more boards, and a plurality of boards may jointly support a radio access network (for example, an LTE network) of a single access standard, or may separately support radio access networks (for example, an LTE network, a 5G network, or another network) of different access standards. The BBU 4200 further includes a memory 4201 and a processor 4202. The memory 4201 is configured to store necessary instructions and data. The processor 4202 is configured to control$^{th}$ e base station to perform a necessary action, for example, is configured to control$^{th}$ e base station to perform the operation procedure related to the network device in the foregoing method embodiments. The memory 4201 and the processor 4202 may serve the one or more boards. In other words, a memory and a processor may be separately disposed on each board. Alternatively, a plurality of boards may share a same memory and a same processor. In addition, a necessary circuit may further be disposed on each board.

It should be understood that the base station 4000 shown in FIG. 10 can implement processes related to the network device in the method embodiment shown in FIG. 2 or FIG. 6. Operations and/or functions of modules in the base station 4000 are separately intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the network device and that is described in the foregoing method embodiments. The RRU 4100 may be configured to perform a sending action by the network device for the terminal device or a receiving operation from the terminal device described in the foregoing method embodiments. For details, refer to the descriptions in the foregoing method embodiments. Details are not described herein again.

It should be understood that the base station 4000 shown in FIG. 10 is merely a possible form of the network device but should not constitute any limitation. The method is applicable to a network device in another form. For example, the network device includes an AAU, and may further include a CU and/or a DU; includes a BBU and an adaptive radio unit (ARU); or includes a BBU. Alternatively, the network device may be customer premises equipment (CPE) or may be in another form. A form of the network device is not limited.

The CU and/or the DU may be configured to perform an action that is implemented inside the network device and that is described in the foregoing method embodiments. The AAU may be configured to perform a sending action by the network device for the terminal device or a receiving operation from the terminal device described in the foregoing method embodiments. For details, refer to the descriptions in the foregoing method embodiments. Details are not described herein again.

A processing apparatus may include at least one processor. The at least one processor is configured to execute a computer program stored in a memory, to enable the processing apparatus to perform the method performed by the terminal device or the network device in any one of the foregoing method embodiments.

An embodiment may further provide a processing apparatus. The processing apparatus includes a processor and a communication interface. The communication interface is coupled to the processor. The communication interface is configured to input and/or output information. The information includes at least one of instructions and data. The processor is configured to execute a computer program, to enable the processing apparatus to perform the method performed by the terminal device or the network device in any one of the foregoing method embodiments.

An embodiment may further provide a processing apparatus. The processing apparatus includes a processor and a memory. The memory is configured to store a computer program, and the processor is configured to invoke the computer program from the memory and run the computer program, to enable the processing apparatus to perform the method performed by the terminal device or the network device in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processing (DSP) circuit, a micro controller unit (MCU), a programmable logic device (PLD), or another integrated chip.

In an implementation process, steps in the foregoing methods can be implemented by using a hardware integrated logic circuit in the processor, or by using instructions in a form of software. The steps of the method with reference to the embodiments may be directly performed by a hardware processor or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments may be an integrated circuit chip and may have a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams in the embodiments. The general-purpose processor may be a microprocessor, or the processor may be any conventional processor or the like. The steps of the method with reference to the embodiments may be directly performed by a hardware decoding processor or may be performed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes, but is not limited to, these and any memory of another proper type.

According to the embodiments, a computer program product includes computer program code. When the computer program code is run on a computer, the computer is enabled to perform the method performed by the terminal device or the method performed by the network device in the embodiment shown in FIG. 2 or FIG. 6.

According to the embodiments, a non-transitory computer-readable storage medium stores program code. When the program code is run on a computer, the computer is enabled to perform the method performed by the terminal device or the method performed by the network device in the embodiment shown in FIG. 2 or FIG. 6.

According to the embodiments, a system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, a communication unit (a transceiver) performs a receiving step or sending step in the method embodiments, and a step other than the sending step and the receiving step may be performed by a processing unit (a processor). For a function of a unit, refer to a corresponding method embodiment. There may be one or more processors.

In the foregoing embodiments, the terminal device may be used as an example of a receiving device, and the network device may be used as an example of a sending device. However, this shall not constitute any limitation. For example, both the sending device and the receiving device may be terminal devices. Types of the sending device and the receiving device are not limited.

Terms such as "component", "module", and "system" indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in the figures, both an application running on a computing device and a computing device may be components. One or more components may reside within the process and/or the execution thread, and the components may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications. A person skilled in the art may use different methods to implement the described functions for each particular application, but it should not be considered that the implementation goes beyond the scope of the embodiments.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the embodiments may be implemented in a form of a software product. The computer software product is stored in a storage medium and includes several instructions for instructing a computer device (the computer device may be a personal computer, a server, or a network device) to perform all or some of the steps of the methods described in the embodiments. The foregoing storage medium includes various media that can store program code, such as a USB flash drive, a removable hard disk, a read-only memory (ROM), a random access memory (RAM), a magnetic disk, or an optical disc.

The foregoing descriptions are merely implementations but are not intended as limiting. Any variation or replacement readily figured out by a person skilled in the art shall fall within to the scope of the embodiments.

What is claimed is:

1. A channel measurement method, comprising:
receiving a plurality of reference signals in a plurality of first frequency domain units in a same time domain unit;
precoding the plurality of reference signals respectively using precoding matrices corresponding to the plurality of first frequency domain units, wherein precoding matrices corresponding to at least two different first frequency domain units in the plurality of first frequency domain units are different;
generating a precoding matrix indicator (PMI) based on the plurality of reference signals, wherein the PMI indicates a plurality of codewords corresponding to a plurality of second frequency domain units, and the plurality of second frequency domain units and the plurality of first frequency domain units belong to a same frequency domain resource;
determining a downlink channel, based on the plurality of codewords; and
sending the PMI.

2. The method according to claim 1, wherein the precoding matrix is a random semi-unitary matrix.

3. The method according to claim 1, wherein the precoding matrix is a product of a fixed beam matrix and a mutually unbiased bases (MUB) matrix, and the fixed beam matrix is a semi-unitary matrix whose different columns have a same beam directivity pattern.

4. The method according to claim 1, wherein the time domain unit is a sub-frame, the first frequency domain unit is a resource block (RB) or a subband, and the second frequency domain unit is an RB or a subband.

5. An apparatus, comprising:
at least one processor, and a memory storing instructions for execution by the at least one processor;
wherein, when executed, the instructions cause the apparatus to perform operations comprising:
receiving a plurality of reference signals in a plurality of first frequency domain units in a same time domain unit, wherein the plurality of reference signals are respectively precoded by using precoding matrices corresponding to the first frequency domain units in which the plurality of reference signals are located, and precoding matrices corresponding to at least two different first frequency domain units in the plurality of first frequency domain units are different;
generating a precoding matrix indicator (PMI) based on the plurality of reference signals, wherein the PMI indicates a plurality of codewords corresponding to a plurality of second frequency domain units, the plurality of second frequency domain units and the plurality of first frequency domain units belong to a same frequency domain resource, and the plurality of codewords are used for determining a downlink channel; and sending the PMI.

6. The apparatus according to claim 5, wherein the precoding matrix is a random semi-unitary matrix.

7. The apparatus according to claim 5, wherein the precoding matrix is a product of a fixed beam matrix and a mutually unbiased bases (MUB) matrix, and the fixed beam matrix is a semi-unitary matrix whose different columns have a same beam directivity pattern.

8. The apparatus according to claim 5, wherein the time domain unit is a sub-frame, the first frequency domain unit is a resource block (RB) or a subband, and the second frequency domain unit is an RB or a subband.

\* \* \* \* \*